US012065877B2

(12) United States Patent
Kirby

(10) Patent No.: US 12,065,877 B2
(45) Date of Patent: Aug. 20, 2024

(54) SEMI-RIGID CHAIN FOR A WINDOW TREATMENT

(71) Applicant: Lutron Technology Company LLC, Coopersburg, PA (US)

(72) Inventor: David A. Kirby, Zionsville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 749 days.

(21) Appl. No.: 17/163,418

(22) Filed: Jan. 30, 2021

(65) Prior Publication Data

US 2021/0254403 A1 Aug. 19, 2021

Related U.S. Application Data

(60) Provisional application No. 62/968,843, filed on Jan. 31, 2020.

(51) Int. Cl.

*E06B 9/78* (2006.01)
*E06B 9/326* (2006.01)
*E06B 9/42* (2006.01)

(52) U.S. Cl.

CPC ................ *E06B 9/78* (2013.01); *E06B 9/326* (2013.01); *E06B 9/42* (2013.01); *E06B 2009/785* (2013.01)

(58) Field of Classification Search

CPC ... E06B 9/78; E06B 9/326; E06B 9/42; E06B 2009/785

See application file for complete search history.

(56) References Cited

U.S. PATENT DOCUMENTS

| | | | |
|---|---|---|---|
| 1,693,457 | A | 11/1928 | Pagano |
| 1,939,766 | A | 12/1933 | Corset |
| 1,947,113 | A | 2/1934 | Russell |
| 2,554,331 | A | 5/1951 | Hunter |
| 4,767,386 | A | 8/1988 | Spaggiari |
| 4,810,238 | A | 3/1989 | Pazdernik |
| 5,465,775 | A | 11/1995 | Biba et al. |
| 5,472,035 | A | 12/1995 | Biba et al. |
| 5,513,687 | A | 5/1996 | Tuzmen et al. |
| 5,553,649 | A | 9/1996 | Chisaka et al. |
| 5,553,653 | A | 9/1996 | Rozon |
| 5,671,793 | A | 9/1997 | Lee |
| 5,722,478 | A | 3/1998 | Claypool et al. |
| 5,749,405 | A | 3/1998 | Huang |
| 5,850,863 | A | 12/1998 | Huang |

(Continued)

FOREIGN PATENT DOCUMENTS

| | | | |
|---|---|---|---|
| GB | 2496639 | A | 5/2013 |
| WO | 2015026142 | A1 | 2/2015 |

*Primary Examiner* — Beth A Stephan

(74) *Attorney, Agent, or Firm* — Michael S. Czarnecki; Glen R. Farbanish; Philip N. Smith

(57) ABSTRACT

A manually-operated window treatment system includes a roller tube, a covering material, and a chain (e.g., a semi-rigid chain). The roller tube is supported at opposed ends thereof. The covering material is attached to the roller tube. The covering material is operable between a raised position and a lowered position via rotation of the roller tube. The chain is configured to be operated by a user to rotate the roller tube. The chain has a first minimum bend radius when bent in a first direction and a second minimum bend radius when bent in a second direction. The first minimum bend radius is less than the second minimum bend radius.

20 Claims, 34 Drawing Sheets

(56) References Cited

U.S. PATENT DOCUMENTS

| | | | |
|---|---|---|---|
| 5,914,198 | A | 5/1999 | Huang |
| 6,085,824 | A | 7/2000 | Cadorette |
| 6,196,293 | B1 | 3/2001 | Lee |
| 6,360,806 | B1 | 3/2002 | Bowman et al. |
| 6,516,860 | B1 | 2/2003 | Weaver et al. |
| 6,644,374 | B2 | 11/2003 | Nien |
| 6,752,194 | B1 | 6/2004 | Huang |
| 7,272,922 | B2 | 9/2007 | Fahrion |
| 7,294,078 | B2 | 11/2007 | He et al. |
| 7,975,838 | B2 | 7/2011 | Reist |
| 8,491,430 | B1 | 7/2013 | Swartz |
| 8,607,541 | B1 | 12/2013 | Cavuoti |
| 9,038,696 | B2 | 5/2015 | Lava et al. |
| 2004/0083709 | A1 | 5/2004 | Ikeda |
| 2004/0084573 | A1 | 5/2004 | Komiya |
| 2008/0257505 | A1* | 10/2008 | Braybrook ................ E06B 9/42 160/321 |
| 2011/0079757 | A1 | 4/2011 | Manvel |
| 2012/0090795 | A1 | 4/2012 | Kirby |
| 2018/0238109 | A1 | 8/2018 | Kanargelidis et al. |
| 2019/0186198 | A1 | 6/2019 | Kirby |

* cited by examiner

SEMI-RIGID CHAIN FOR A WINDOW TREATMENT

CROSS-REFERENCE TO RELATED APPLICATIONS

This application claims priority to U.S. Provisional Patent Application No. 62/968,843, filed on Jan. 31, 2020, the entire disclosure of which is incorporated by reference herein.

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows that the roller shade is mounted in front of.

A typical window treatment can be manually operated or motor operated. In the case of a manually-operated window treatment, the rotation of the roller tube is provided by an input wheel that receives an input chain or cord. The input wheel converts a pulling force applied to the input chain into a rotation force. A typical input chain is a ball chain loop.

SUMMARY

In one aspect, a chain for a window treatment, such as a shade, roller shade, roman shade, venetian blind, or drapery, includes a plurality of members joined in a loop. The chain has a first minimum bend radius when bent in a first direction and a second minimum bend radius when bent in a second direction. The first minimum bend radius is less than the second minimum bend radius.

In another aspect, a chain for a window treatment, such as a shade, includes a plurality of members joined in a loop. Each member of the chain is configured to contact an adjacent member of the chain to restrict bending of the chain in at least one direction such that a minimum bend radius of the chain in the at least one direction is greater than or equal to about three inches.

In another aspect, a chain for a shade includes a flexible elongate string forming a loop and a plurality of members fixedly coupled to the string such that each member of the plurality of members is located at a respective position along a length of the string. Each of the plurality of members includes a body coupled to the string and an arm extending from the body. The arm of each of the plurality of members is configured to contact an adjacent member when the string is bent in at least one direction to restrict bending of the string in the at least one direction.

In another aspect, a chain for a shade includes a flexible elongate string forming a loop and a plurality of members fixedly coupled to the string such that each member of the plurality of members is located at a respective position along a length of the string. Each of the plurality of members includes a body coupled to the string and an arm extending from the body. When coupled to a sprocket of the shade, a frontal plane transects each of the members engaged with the sprocket and a transverse plane is orthogonal to the frontal plane. The arm of each member is configured to contact an adjacent member to restrict (i) bending of the chain in the transverse plane and (ii) bending of the chain in a first direction in the frontal plane, while not restricting bending of the chain in an opposite second direction in the frontal plane.

In another aspect, a ball chain for a shade includes a plurality of members connected in series. Each of the plurality of members includes a body and an arm extending from the body. The arm couples the member to an adjacent member. When coupled to a sprocket of the shade, a frontal plane transects each of the members engaged with the sprocket and a transverse plane is orthogonal to the frontal plane. The arm of each member is configured to contact an adjacent member to restrict (i) bending of the chain in the transverse plane and (ii) bending of the chain in a first direction in the frontal plane, while not restricting bending of the chain in an opposite second direction in the frontal plane.

In another aspect, a ball chain for a shade includes a plurality of members connected in series. Each of the plurality of members includes a body and an arm extending from the body. The arm couples the member to an adjacent member. The arm of each member of the plurality of members includes two projections forming a fork. The body of each member of the plurality of members defines a recess extending from an outer face of the body. The arm extends along a central longitudinal axis. The recess is non-symmetric with respect to the central longitudinal axis. The body of an adjacent member is disposed at least partially between the projections of the fork with the arm disposed in the recess in the body of the adjacent member such that contact of a wall of the recess of the body of the adjacent member with the arm limits rotation of the adjacent member.

In another aspect, a method includes providing a string. The method further includes forming a first set of members on the string with the first set of members spaced along the string. The method further includes forming a second set of members on the string after forming the first set of members. Each member of the second set of members is disposed between adjacent members of the first set of members.

In another aspect, a chain for a shade includes a plurality of members joined in a loop. The plurality of members are configured to collectively limit the chain from freely bending in at least one direction.

In another aspect, a ball includes a body configured to be coupled to a string for forming a chain for a shade and an arm extending from the body. The arm is configured to contact an adjacent member of the chain when the string is bent in a first direction to restrict bending of the string in the first direction.

In another aspect, a ball for use in forming a ball chain includes a body defining a cavity and an arm extending from the body. A first end of the arm includes a fork disposed in the cavity of the body. The fork includes two projections sized to receive a second end of an arm of an adjacent member.

In another aspect, a ball for use in forming a ball chain includes a body and an arm extending from the body. The body is configured to couple to an arm of a first adjacent member and the arm is configured to couple to a body of a second adjacent member. The arm defines a central longitudinal axis and includes two projections forming a fork. The body defines a recess extending from an outer face of the body. The recess is non-symmetric with respect to the central longitudinal axis. The recess is sized to receive the arm of the first adjacent member such that contact of a wall of the recess with the arm of the first adjacent member limits movement of the first adjacent member.

In another aspect, a ball for use in forming a ball chain includes a body and an arm. The body defines a recess and a slot through the body. The arm extends from the body and has an extension and a plate. The plate of the arm is sized to be received in the cavity of the body of an adjacent member and the extension is sized to be received in a slot of the adjacent member such that engagement of the arm with the adjacent member limits rotation of the member.

In another aspect, a ball for use in forming a ball chain includes a body and an arm. The body includes a base and a first wing and a second wing. The first and second wings extending upwardly from the base such that a cavity is defined between the base and the first and second wings. Each of the first wing and the second wing define an aperture. The arm extends from the body and includes an extension and a plate transverse to the extension. The cavity is sized to receive a plate of an adjacent member with the plate of the adjacent member engaging the apertures of the first and second wings.

In another aspect, a chain for a shade includes a first member and a second member. The first member includes a body and an arm extending from the body. The second member is spaced apart from the first member. The arm of the first member is configured to contact the second member to restrict bending of the chain in at least one direction.

In another aspect, a manually-operated window treatment system includes a roller tube, a covering material, and a chain. The roller tube is supported at opposed ends thereof. The covering material is attached to the roller tube. The covering material is operable between a raised position and a lowered position via rotation of the roller tube. The chain is configured to be operated by a user to rotate the roller tube. The chain has a first minimum bend radius when bent in a first direction and a second minimum bend radius when bent in a second direction. The first minimum bend radius is less than the second minimum bend radius.

In another aspect, a manually-operated window treatment system includes a roller tube, a covering material, and a chain. The roller tube is supported at opposed ends thereof. The covering material is attached to the roller tube. The covering material is operable between a raised position and a lowered position via rotation of the roller tube. The chain is configured to be operated by a user to rotate the roller tube. The chain includes a plurality of members joined in a loop. Each member of the chain is configured to contact an adjacent member of the chain to restrict bending of the chain in at least one direction such that a minimum bend radius of the chain in the at least one direction is greater than or equal to about three inches.

In another aspect, a drive system for a window treatment includes a sprocket and a chain. The sprocket is configured to be coupled to a roller tube of the window treatment such that the sprocket rotates with the roller tube. The chain is engaged with the sprocket. The chain includes a plurality of members joined in a loop. The chain has a first minimum bend radius when bent in a first direction and a second minimum bend radius when bent in a second direction. The first minimum bend radius is less than the second minimum bend radius.

In another aspect, a drive system for a window treatment includes a sprocket and a chain. The sprocket is configured to be coupled to a roller tube of the window treatment such that the sprocket rotates with the roller tube. The chain is engaged with the sprocket. The chain includes a plurality of members joined in a loop. Each member of the chain is configured to contact an adjacent member of the chain to restrict bending of the chain in at least one direction such that a minimum bend radius of the chain in the at least one direction is greater than or equal to about three inches.

DETAILED DESCRIPTION

Figure 1:
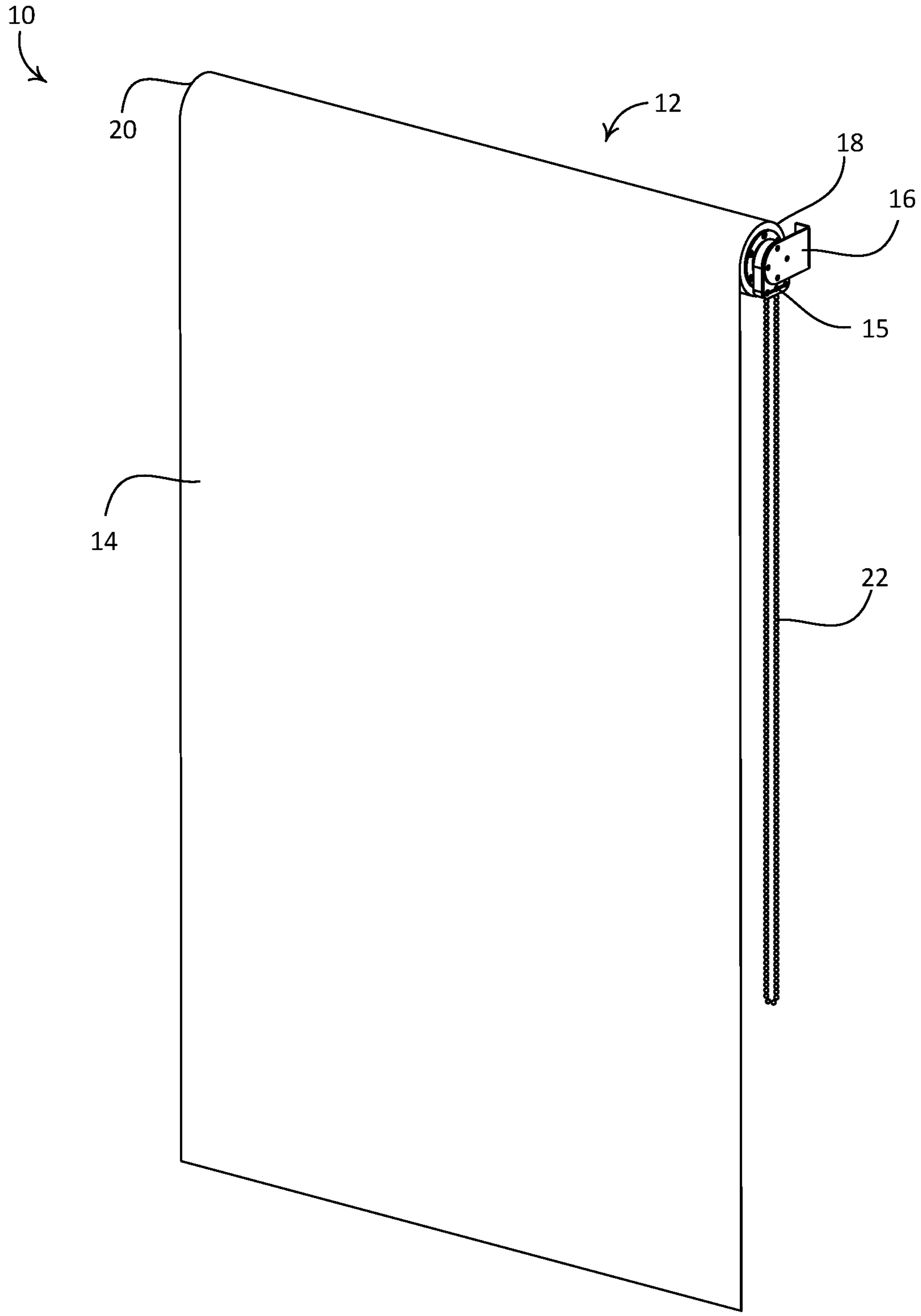
FIG. 1 is an example manual roller shade with a semi-rigid chain.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The terms "inboard face," "inboard side" or "inboard end" are used to refer to a face, side or end that is nearer the longitudinal center of the roller tube than a corresponding "outboard face," "outboard side" or "outboard end."

The roller shades described herein include chains (e.g., drive chains) that include features that restrict bending of the chain in one or more directions. These chains may be referred to as semi-rigid, as the flexibility of the chain may be limited by the design of the chain. As described in more detail herein, the design of the chain can be configured such that the chain is more flexible in one direction than in one or more other directions. In other words, the radius into which the chain can be formed may be limited in one or more directions. Such chains may be advantageous when used to drive manual shade systems.

FIG. 1 depicts an example manual roller shade 10 with a semi-rigid chain 22 (e.g., a drive chain or drive cord). The example manual roller shade 10 may include a roller tube 12, a covering material 14, a drive assembly, such as a manual clutch mechanism 15, and one or more brackets 16. The covering material 14 may be windingly received by the roller tube 12. The roller tube 12 may be elongate from a first end 18 to a second end 20. The manual clutch mechanism may be located at the first end 18 of the roller tube 12. The manual clutch mechanism may be bi-directional to provide for raising and lowering of the covering material 14. The covering material may be a flexible shade fabric. The manual clutch mechanism may be configured to rotatingly drive the roller tube 12. The manual clutch mechanism may be configured to prevent back-driving of the roller tube 12 that could otherwise occur, for example, if a pulling force was applied to a lower end of the covering material 14 supported by the roller tube 12. An example of a manual clutch mechanism is described in greater detail in commonly-assigned U.S. Patent Application Publication No. 2010/0219306, published Sep. 2, 2010, entitled MANUAL ROLLER SHADE HAVING CLUTCH MECHANISM, CHAIN GUIDE AND UNIVERSAL MOUNTING, the entire disclosure of which is hereby incorporated by reference.

The manual roller shade 10 may also include an idler assembly (not shown). The idler assembly may be located adjacent to the second end 20 of the roller tube 12 opposite the manual clutch mechanism. The idler assembly may provide rotatable support for the roller tube 12 at the second end 20 of the roller tube 12. The brackets 16 may be located at opposite ends of the manual roller shade 10 for supporting the manual roller shade 10 from a fixed support surface such as a wall or ceiling of a structure, for example.

The semi-rigid chain 22 may be a drive chain. The semi-rigid chain 22 may be received by the manual clutch mechanism 15 for rotating the roller tube 12. For example, the semi-rigid chain 22 may be received by the manual clutch mechanism 15 such that oppositely-located (e.g., front and rear) portions of the semi-rigid chain 22 hang from the manual clutch mechanism. For example, the semi-rigid chain 22 may be free hanging such that a lower portion of the semi-rigid chain 22 is not anchored. For example, the lower portion of the semi-rigid chain 22 may not require a tensioner. As another example, the semi-rigid chain 22 may be configured to be anchored such that the lower portion of the semi-rigid chain 22 operates around an anchor and/or tensioner. The semi-rigid chain 22 may form a loop, e.g., a continuous loop.

The semi-rigid chain 22 may be configured to rotate the roller tube 12. For example, the semi-rigid chain 22 may be configured to provide for a sufficient number of rotations of the roller tube 12 for raising or lowering the covering material 14 when a pulling force is applied to a front or rear portion of the semi-rigid chain 22. Each of the opposite hanging portions of the semi-rigid chain 22 may be configured to be graspable by a user such that a pulling force can be applied to each respective hanging portion for drivingly rotating the roller tube 12 to either wind or unwind the covering material 14. For example, when a pulling force is applied to a respective hanging portion of the semi-rigid chain 22, the semi-rigid chain may rotate a drive element (e.g., such as a drive pulley or sprocket) of the manual roller shade 10. Rotation of the drive element may cause the roller tube 12 to rotate such that the covering material 14 is raised or lowered. For example, the semi-rigid chain 22 may be operatively coupled to the drive element.

Figure 2:
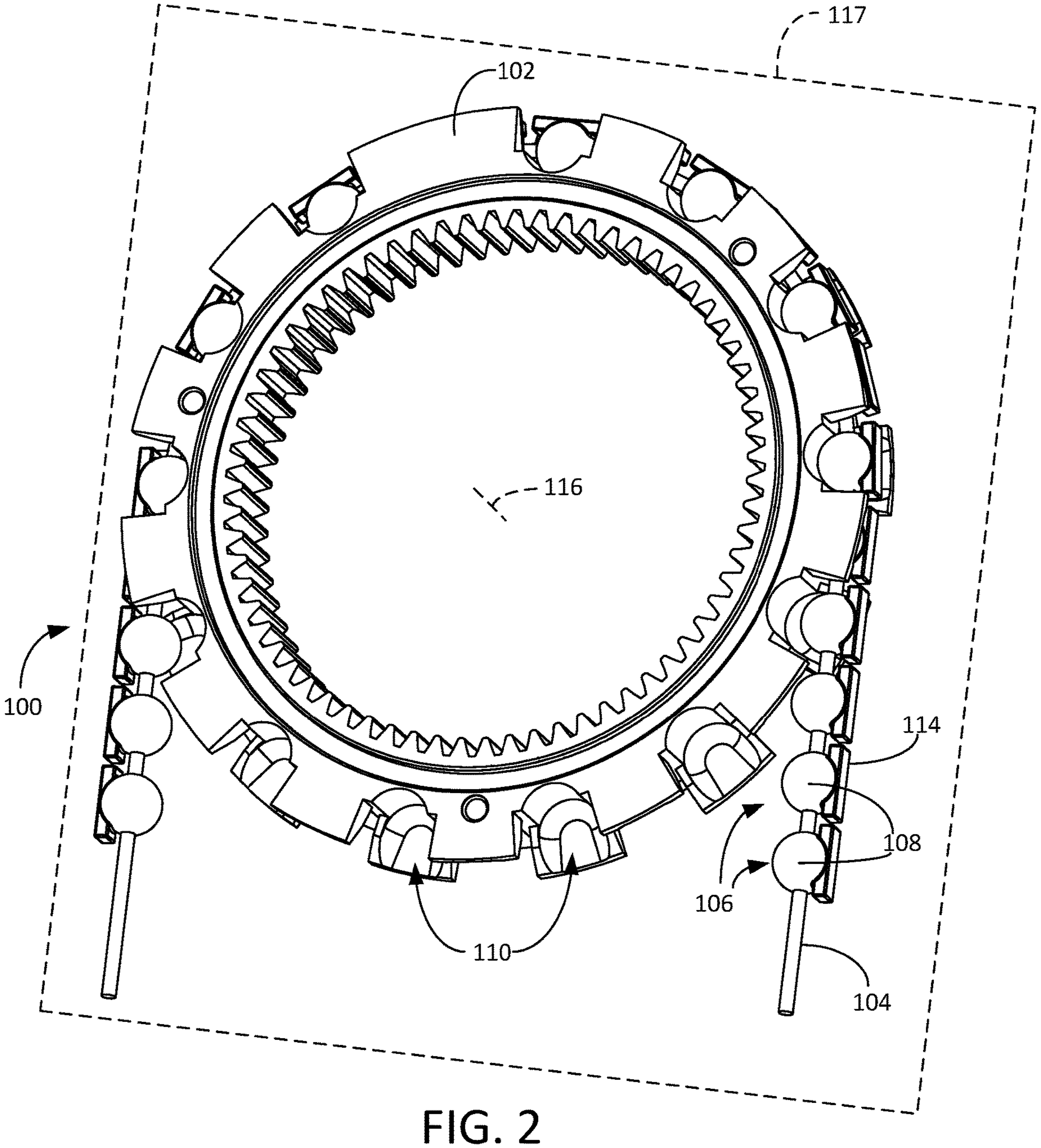
FIG. 2 is a perspective view of a semi-rigid chain according to an embodiment engaged with a sprocket of a manual roller shade.

FIG. 2 shows a first embodiment of a semi-rigid chain 100 engaging a sprocket 102 of a roller shade (e.g., the manual roller shade 10). The sprocket 102 may be a portion of a manual clutch mechanism (e.g., the manual clutch mechanism 15, such as the manual clutch mechanism described in U.S. Patent Application Publication No. 2010/0219306). The semi-rigid chain 100 may include a string 104 and a plurality of members 106 (e.g., beads) coupled to the string 104 such that each member 106 is located at a respective position along a length of the string 104. Each of the members 106 may include a body 108 that is configured to be received in a recess 110 of the sprocket 102. For example, the body 108 may be substantially spherical. As such, the semi-rigid chain 100 can be used to rotate the sprocket 102 to raise and lower the covering material 14, as described above. The string 104 can be constructed of any appropriate material, including those commonly used in prior art chains.

Figure 3:
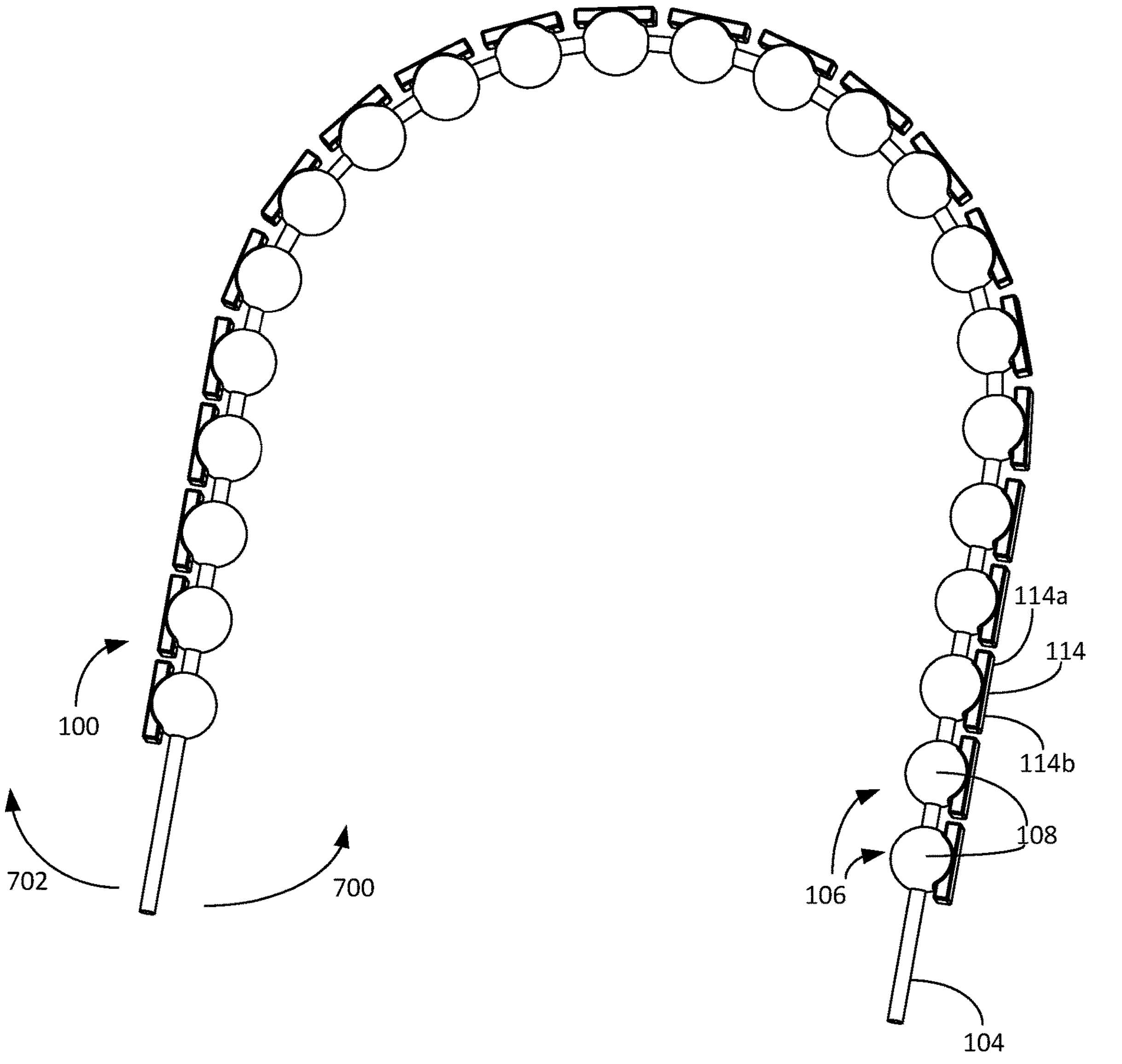
Figure 4:
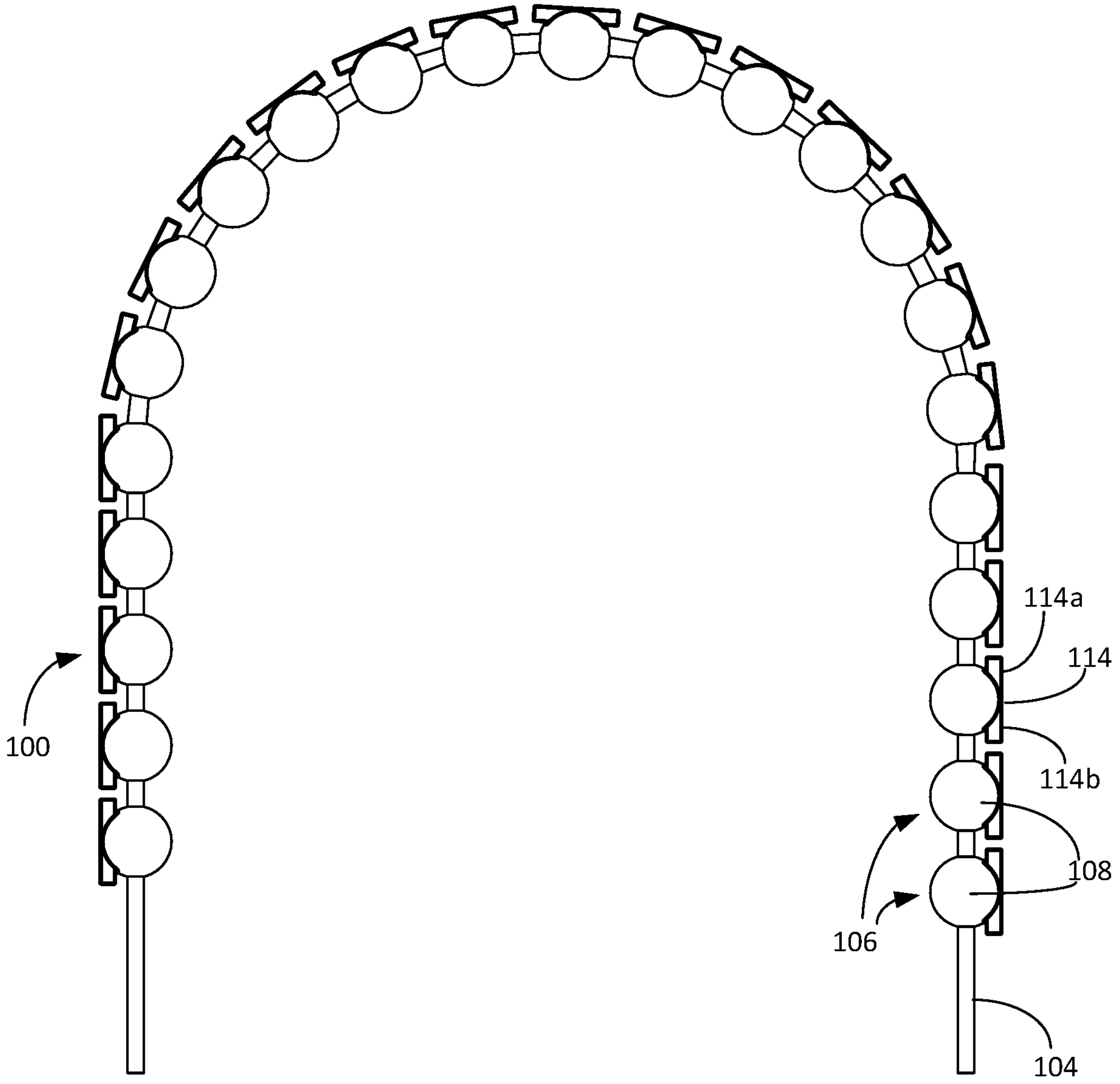
FIG. 4 is a partial front view of the semi-rigid chain of FIG. 2.
Figure 6:
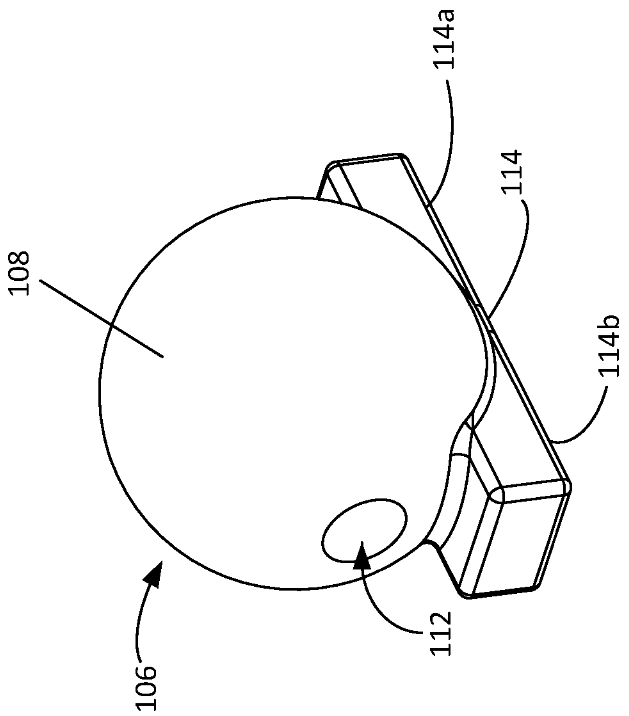
FIGS. 5 and 6 are perspective views of a member of the semi-rigid chain of FIG. 2.
Figure 5:
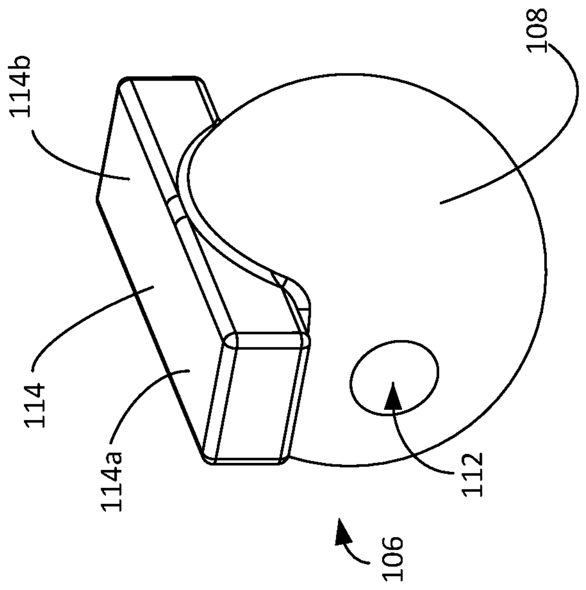
Figure 11:
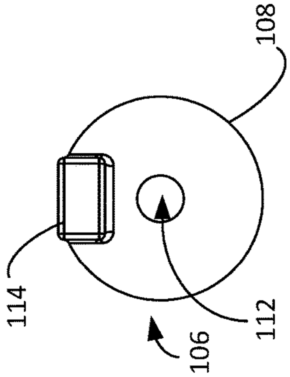
FIGS. 7-11 are front, top, bottom, left, and right views of a member of the semi-rigid chain of FIG. 2.
Figure 8:
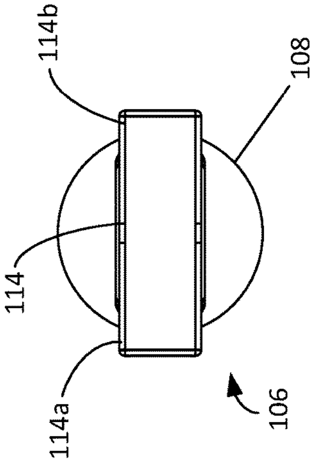
Figure 7:
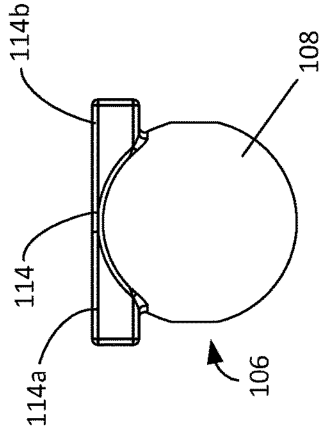
Figure 9:
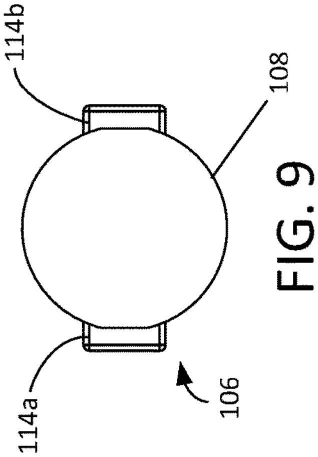
Figure 10:
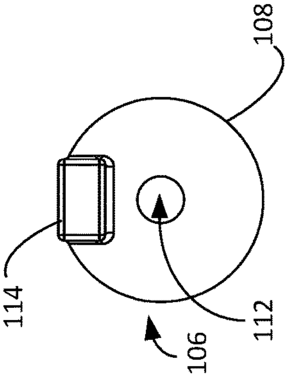

FIGS. 3 and 4 show partial perspective and front views, respectively, of the chain 100. Although only a portion of the chain 100 is shown, it should be understood that the chain 100 may form a closed loop, as illustrated in FIG. 1. FIGS. 5 and 6 show perspective views of an individual member 106 of the chain 100. FIGS. 7-11 show front, top, bottom, and side views of an individual member 106 of the chain 100. As shown, each member 106 may further include an aperture 112 through the body 108 to receive the string 104. In addition, each member may include an arm 114 extending from the body 108. For example, as shown in FIGS. 3 and 4, the arm 114 of each member 106 may be disposed on the outside of the loop of the chain 100 and may extend substantially parallel to the portion of the string 104 that passes through the body 108. The arm 114 may extend from the body 108 in two directions and, in some embodiments, in two collinear directions. In such embodiments, as shown in FIGS. 3 and 4, a first portion 114*a* of the arm 114 extends toward a first adjacent member 106 and a second portion 114*b* of the arm 114 extends toward a second adjacent member 106.

The arms 114 of adjacent members 106 may be configured to come into contact to limit bending of the chain in at least one direction. For example, the chain 100 may be able to bend about the central axis 116 of the sprocket 102 (shown in FIG. 2) (i.e., in the direction of arrow 700 in FIG. 3) so that the chain 100 can rotate around the sprocket 102 when the chain 100 hangs freely from the sprocket 102. In other words, the chain 100 can bend in a frontal plane 117 that is perpendicular to the central axis 116. The frontal plane 117 can transect each of the members 106 engaged with the sprocket 102. In contrast, bending of the chain 100 in the opposite direction (i.e., away from the center of the loop of the chain 100 or away from the area between the hanging portions of the chain 100 or in the direction of arrow 702 in FIG. 3) may cause the first portion 114*a* of an arm 114 of one member 106 to contact the second portion 114*b* of an arm 114 of an adjacent member 106. This contact may restrict bending of the chain 100 in this direction. For example, the minimum bend radius of the chain 100 in the direction of arrow 702 may be greater than or equal to about three inches. Contact of the arms 114 of adjacent members 106 may also restrict bending of the chain 100 out of the plane of the sprocket 102 (i.e., in a plane transverse to the frontal plane 117). For example, the ends of the arms 114 of adjacent members 106 may be sufficiently wide (the dimension out of the plane of the sprocket 102) such that a force acting to bend the chain 100 out of the plane of the sprocket 102 causes the edges of the ends of the arms 114 to come into contact to restrict bending.

Figure 12:
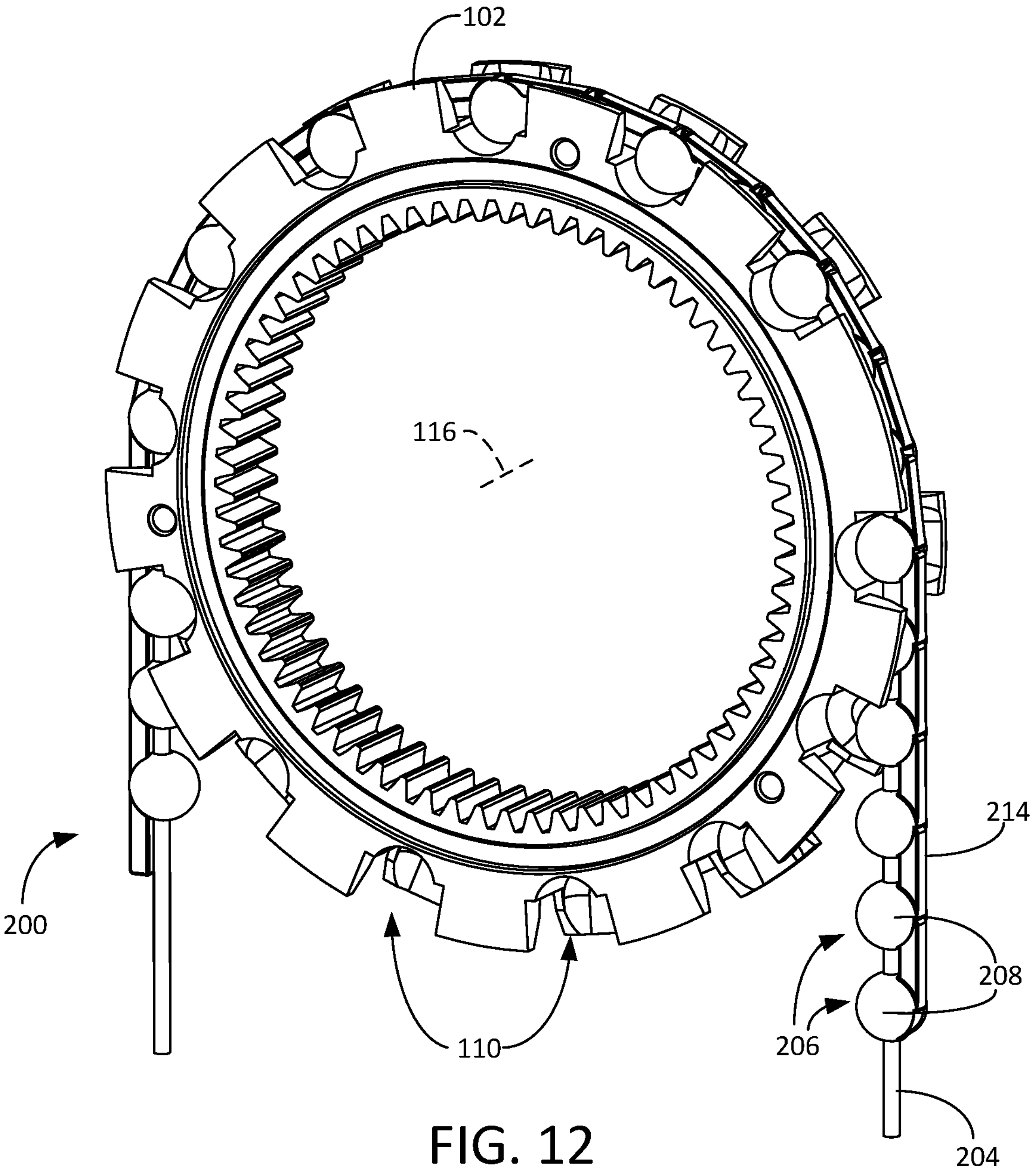
FIG. 12 is a perspective view of a semi-rigid chain according to another embodiment engaged with a sprocket of a manual roller shade.

FIG. 12 shows another embodiment of a semi-rigid chain 200 engaged with the sprocket 102. The chain 200 includes a string 204 and a plurality of members 206 coupled to the string 204 such that each member 206 is located at a respective position along a length of the string 204. As with the embodiment of FIGS. 2-11, each member 206 may include a body 208 configured to be received in one of the recesses 110 in the sprocket 102 such that the chain 200 may be used to rotate the sprocket 102 and, thereby, raise and lower a window covering (e.g., window covering 14). The body 208 may be substantially spherical.

Figure 13:
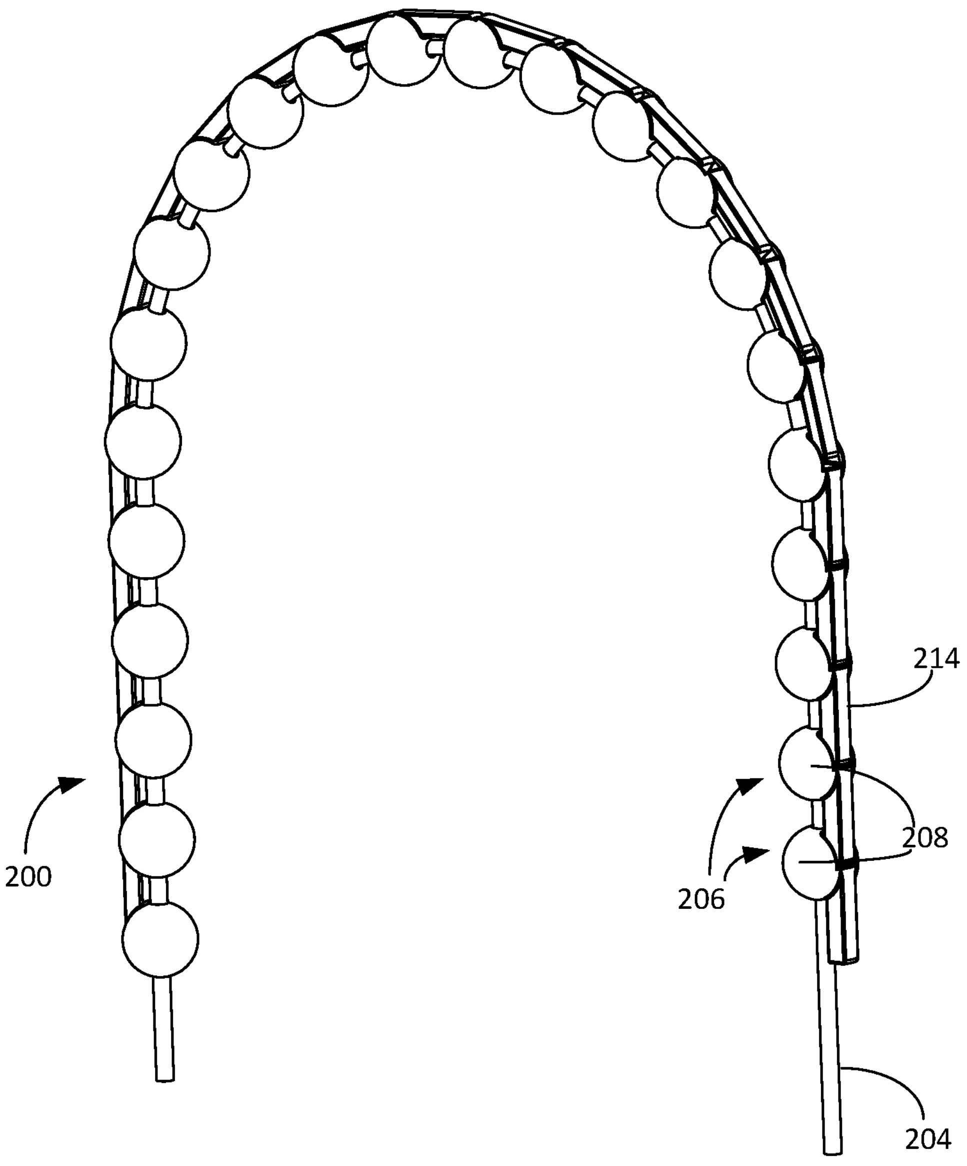
FIG. 13 is a partial perspective view of the semi-rigid chain of FIG. 12.
Figure 14:
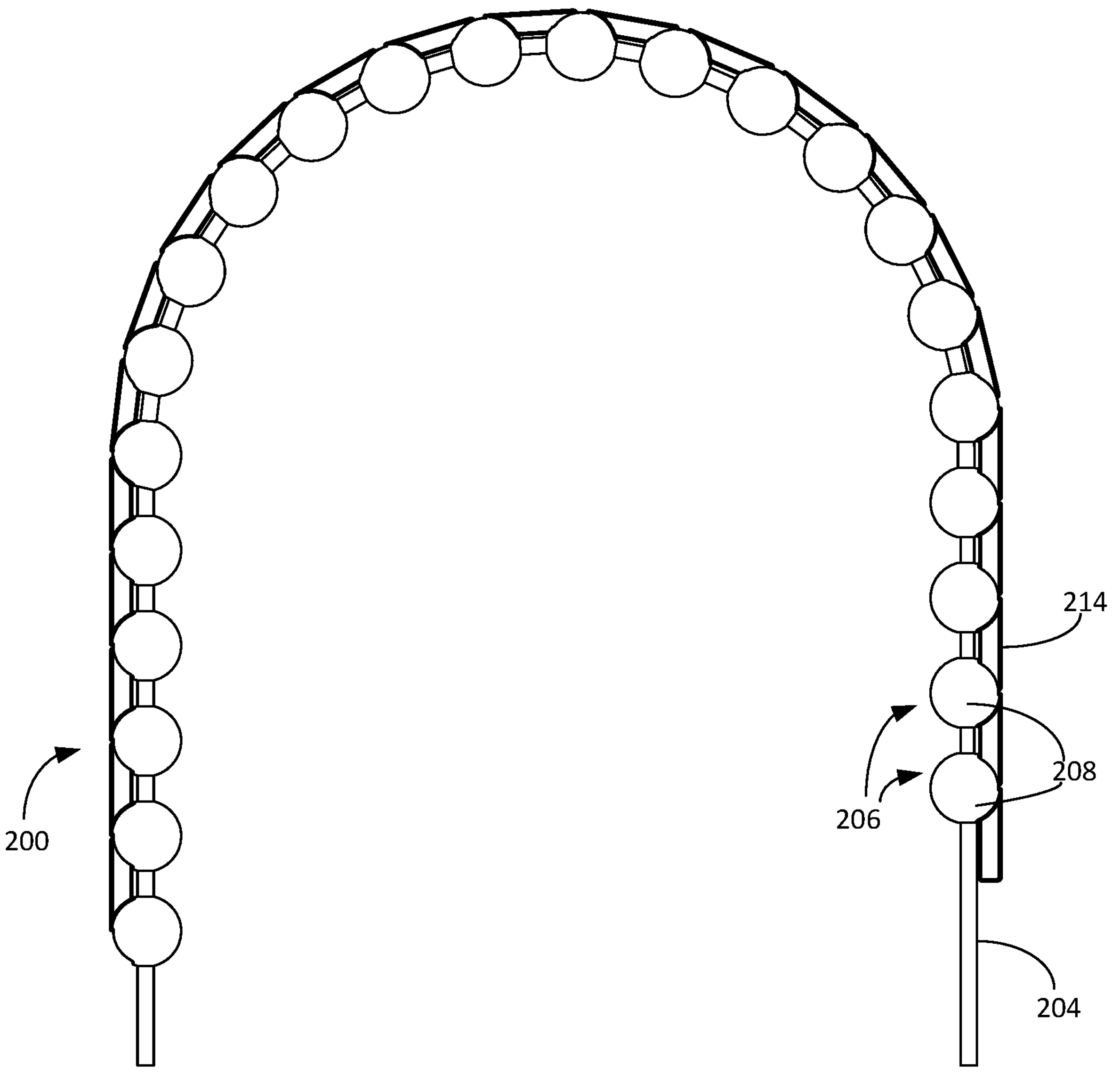
FIG. 14 is a partial front view of the semi-rigid chain of FIG. 12.
Figure 16:
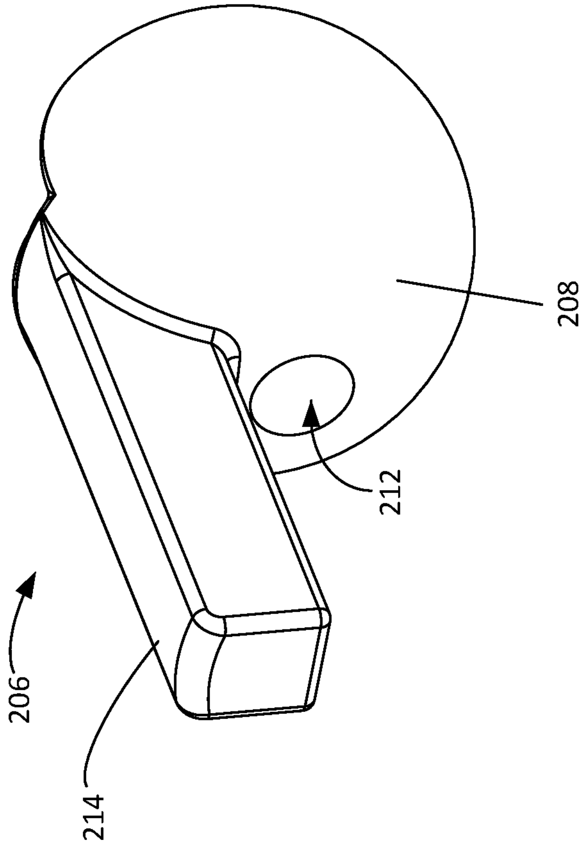
FIGS. 15 and 16 are perspective views of a member of the semi-rigid chain of FIG. 12.
Figure 15:
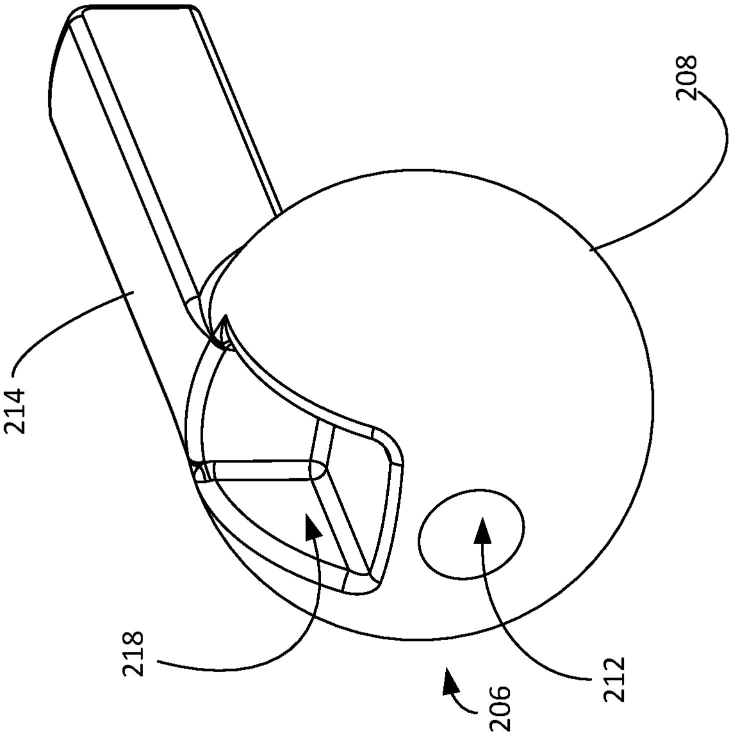
Figure 21:
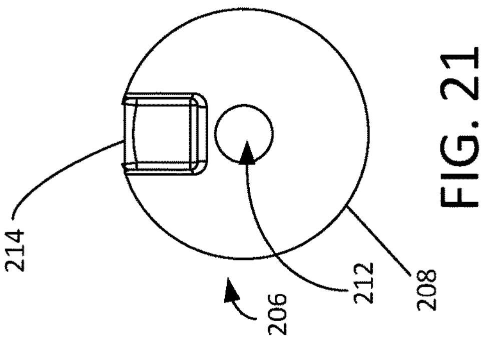
FIGS. 17-21 are front, top, bottom, left, and right views of a member of the semi-rigid chain of FIG. 12.
Figure 18:
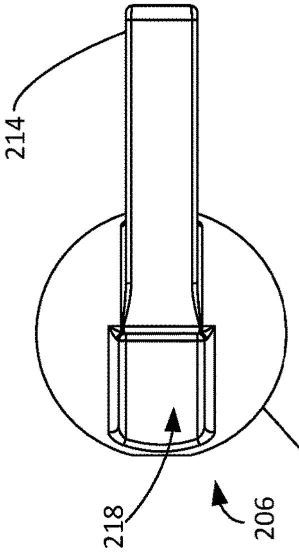
Figure 17:
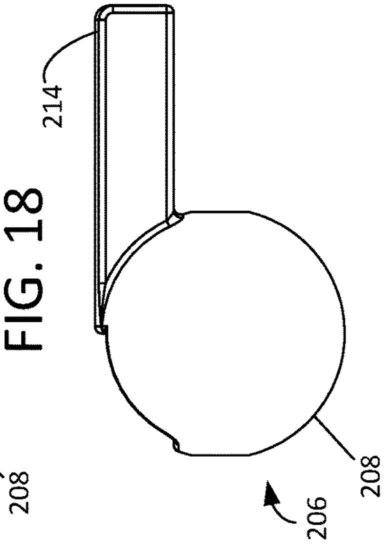
Figure 19:
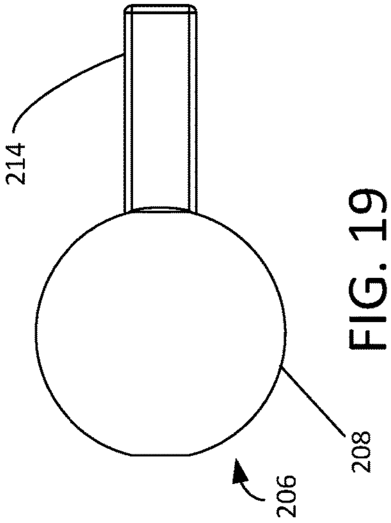
Figure 20:
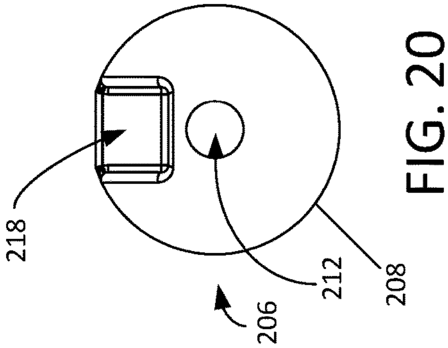

FIGS. 13 and 14 show perspective and front views of the chain 200. FIGS. 15 and 16 show perspective views of a single member 206 of the chain 200. FIGS. 17-21 show front, top, bottom, and side views of a single member 206 of the chain 200. The body 208 may define an aperture 212 configured to receive the string 204. The member 206 further may include an arm 214 extending from the body 208. In the illustrated embodiment, the arm 214 may extend from the body 208 in only a single direction. The body 208 further may define a cavity 218. As shown best in FIG. 13, the cavity 218 may be configured to receive an arm 214 of an adjacent member 206. As shown in FIG. 15, the cavity 218 may be on the same side of the body 208 as the arm 214, with the arm 214 extending away from the cavity 218.

The engagement of the arm 214 with a cavity 218 of an adjacent member 206 may restrict bending of the chain 200. For example, the chain 200 may be able to bend about the central axis 116 of the sprocket 102 (shown in FIG. 12)—in other words, in the direction of arrow 700 in FIG. 3—so that the chain 200 can rotate around the sprocket 102. In contrast, bending of the chain 200 in the opposite direction (i.e., away from center of the loop of the chain 200; illustrated by arrow 702 in FIG. 3) may be restricted by contact between the arm 214 of one member and the walls of the cavity 218 of an adjacent member 206. This contact may restrict bending of the chain 200 in this direction. Contact of the arm 214 with the sides of the cavity 218 may also restrict bending of the chain 200 out of the plane of the sprocket 102 (i.e., plane 117 shown in FIG. 2). For example, the minimum bend radius of the chain 200 may be greater than about 3 inches in the direction of arrow 702 and away from the plane of the sprocket 102.

Figure 22:
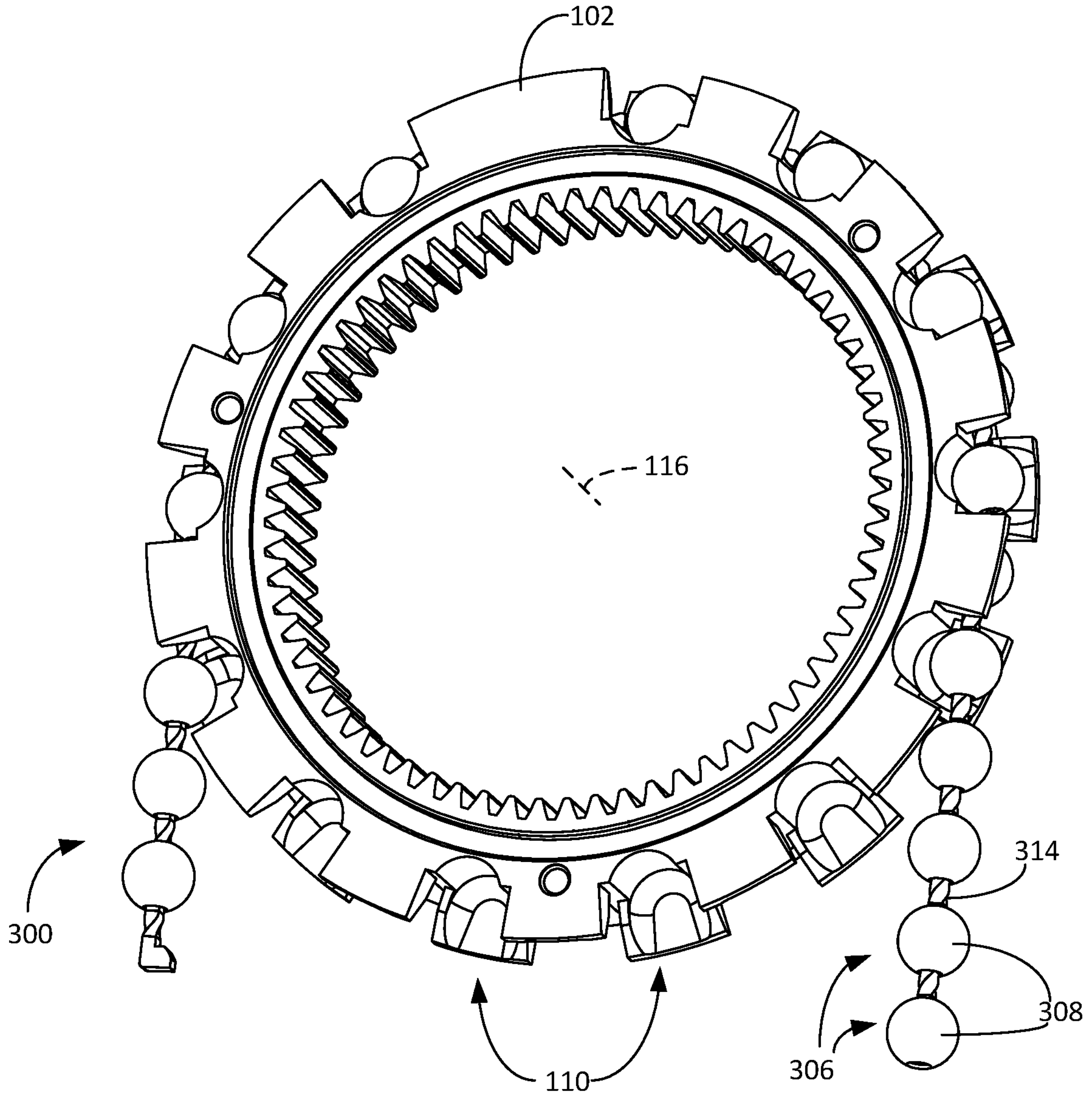
FIG. 22 is a perspective view of a semi-rigid chain according to another embodiment engaged with a sprocket of a manual roller shade.
Figure 32:
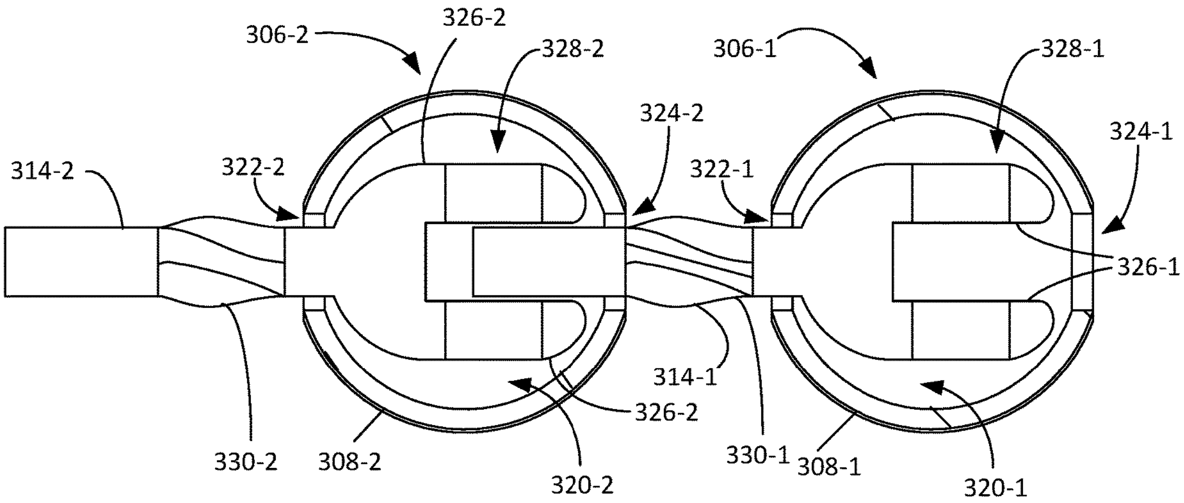
FIG. 32 is a cross-sectional view of two members of the semi-rigid chain of FIG. 22 taken along the plane indicated in FIG. 27.
Figure 33:
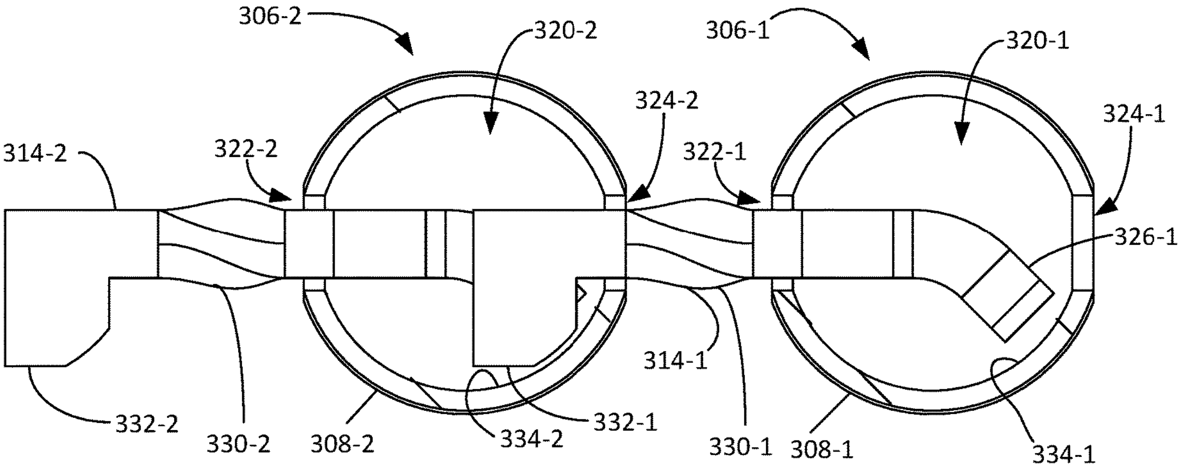
FIG. 33 is a cross-sectional view of two members of the semi-rigid chain of FIG. 22 taken along the plane indicated in FIG. 29.

FIG. 22 shows another embodiment of a semi-rigid chain 300 engaged with the sprocket 102. The chain 300 may include a plurality of members 306 joined together in a loop. Each of the members 306 may include a body 308 (e.g., bodies 308-1 and 308-2 as depicted in FIGS. 32 and 33) and an arm 314 (e.g., arms 314-1 and 314-2 as depicted in FIGS. 32 and 33) and may be joined together in a loop by engagement of the arm 314 of each member 306 with the body 308 of an adjacent member 306. As with the embodiment of FIGS. 2-11, the body 308 of each member 306 may be configured to be received in one of the recesses 110 of the sprocket 102 such that the chain 300 can be used to rotate the sprocket and, thereby, raise and lower a window covering (e.g., window covering 14). The body 308 may be substantially spherical. The chain 300, as well as the chains 400, 500, 600 described subsequently, can also be referred to as a ball-chain chain.

Figure 23:
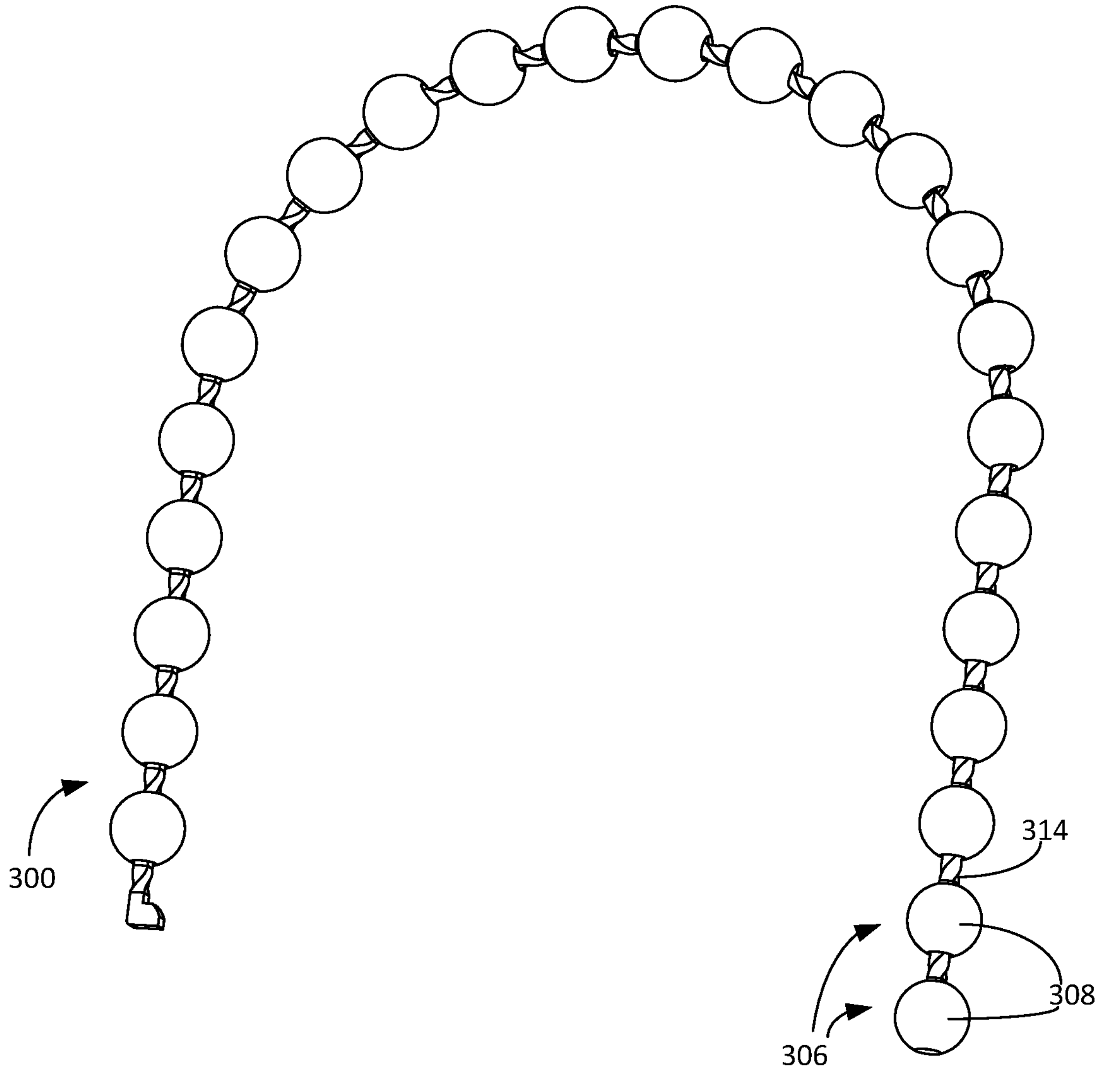
FIG. 23 is a partial perspective view of the semi-rigid chain of FIG. 22.
Figure 24:
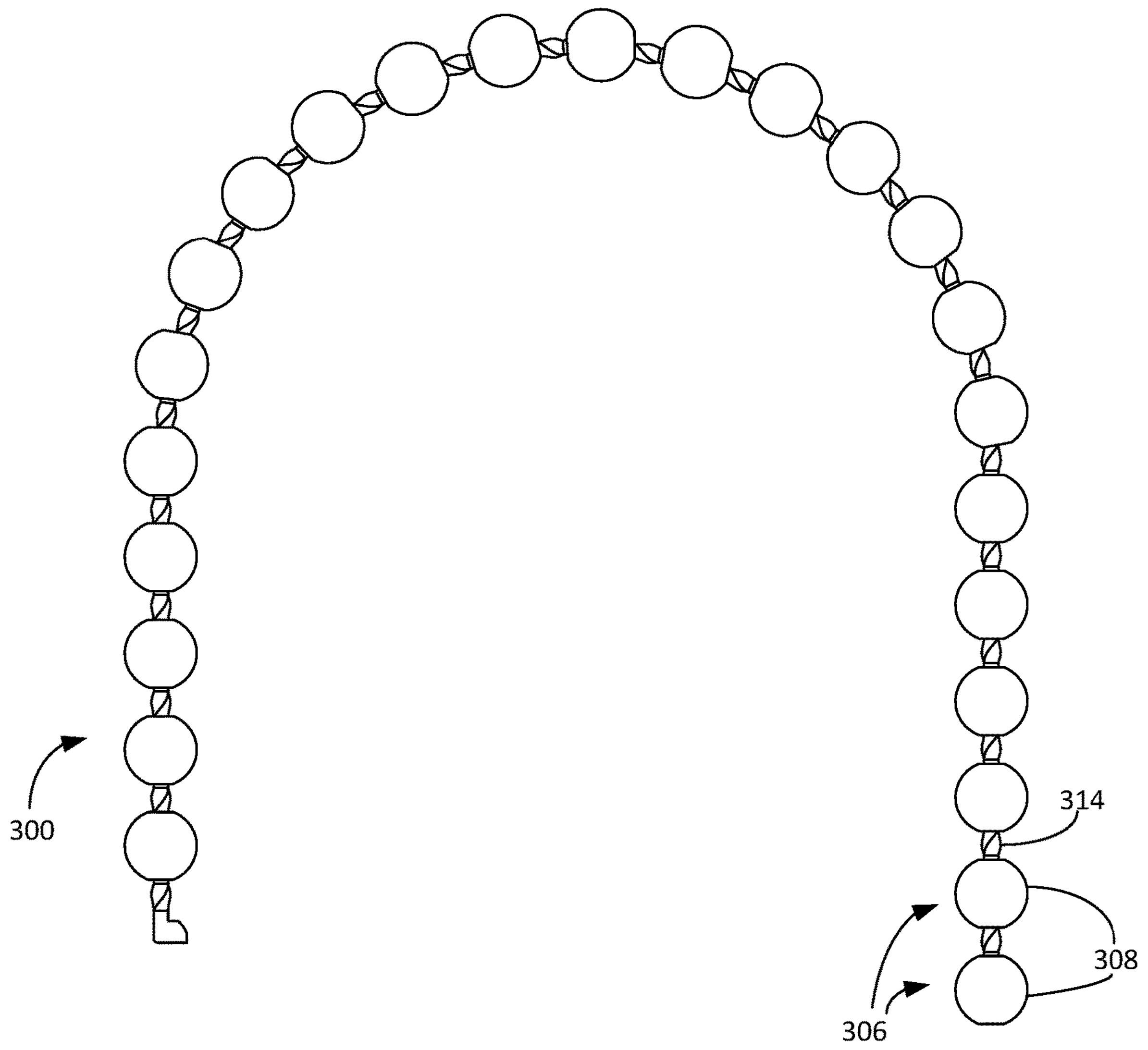
FIG. 24 is a partial front view of the semi-rigid chain of FIG. 22.
Figure 25:
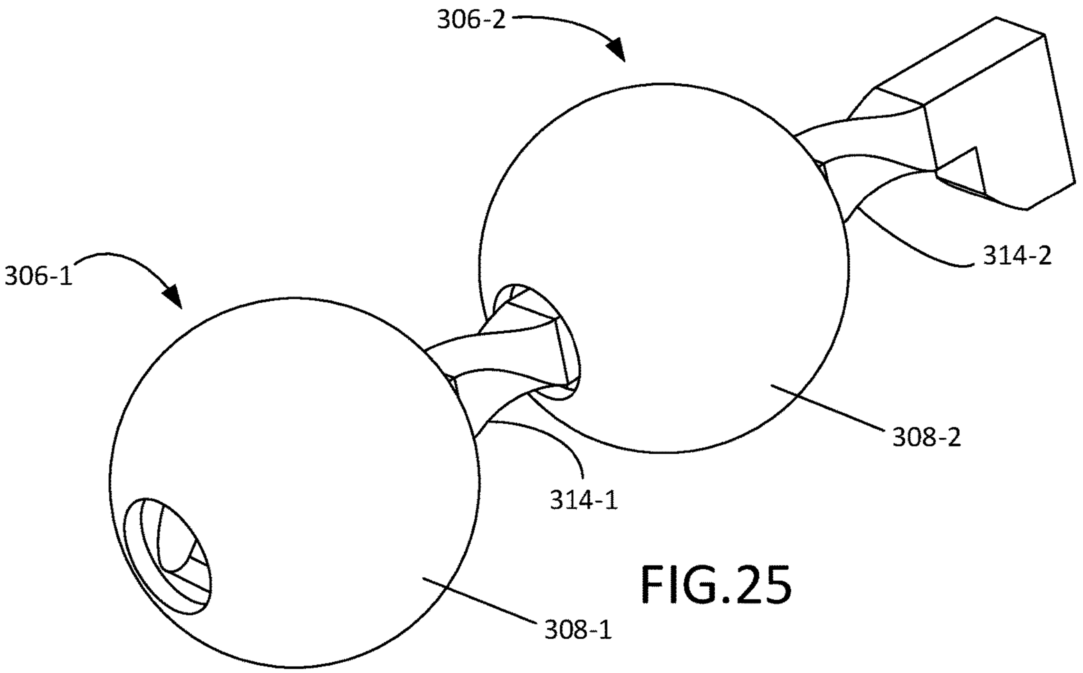
FIGS. 25 and 26 are perspective views of two members of the semi-rigid chain of FIG. 22.
Figure 26:
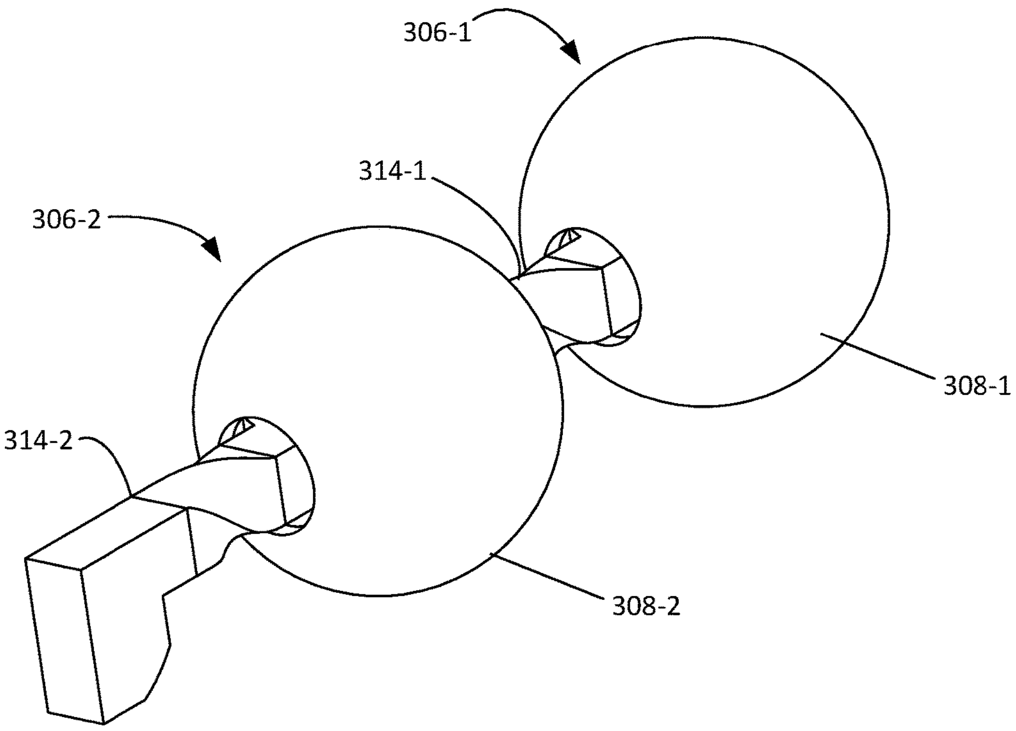
Figures 27, 28, 29, 30, 31:
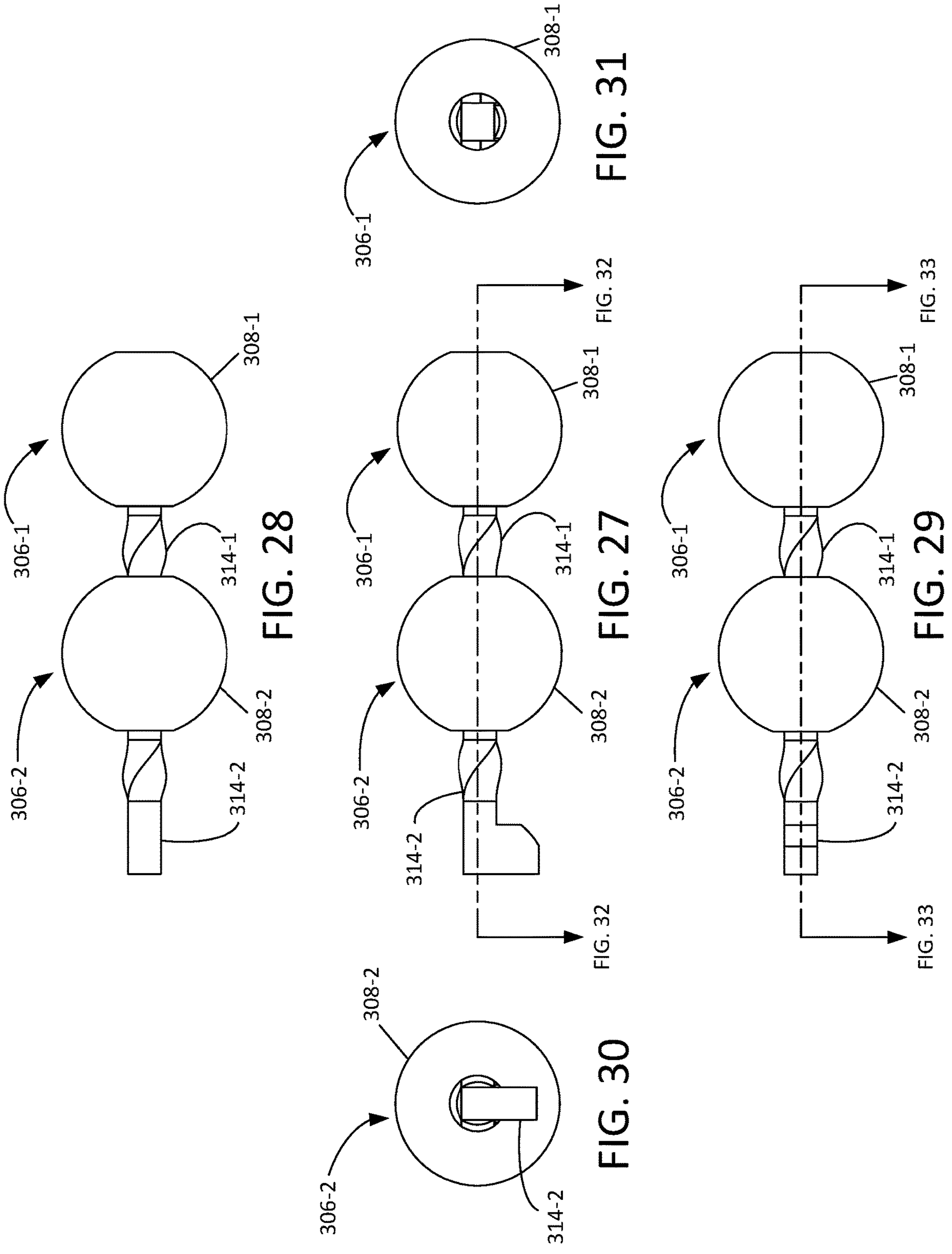
FIGS. 27-31 are front, top, bottom, left, and right views of two member of the semi-rigid chain of FIG. 22.

FIGS. 23 and 24 show partial perspective and front views of the chain 300. FIGS. 25 and 26 show perspective views of two members 306-1, 306-2 of the chain 300 joined together. FIGS. 27-31 show front, top, bottom, and side views of the two members 306-1, 306-2 of the chain 300 joined together. FIGS. 32 and 33 show cross-sectional views of the two members 306-1, 306-2 of the chain 300 joined together. The body 308 of each member 306 may be hollow and define a cavity 320 (e.g., cavities 320-1 and 320-2 as depicted in FIGS. 32 and 33), and may include opposed (i.e., antipodal) apertures 322, 324 entering into the cavity 320. The arm 314 of one member 306 (e.g., arm 314-1 of member 306-1) may pass through the first aperture (e.g., first aperture 322-1) of the respective member and pass through the second aperture of an adjacent member (e.g., second aperture 324-2 of member 306-2). As shown best in FIG. 32, the arm 314 of each member 306 may include two projections 326 (e.g., projections 326-1 and 326-2 as depicted in FIGS. 32 and 33) at one end forming a fork 328 (e.g., forks 328-1 and 328-2 as depicted in FIGS. 32 and 33). The fork 328 may be configured to receive the arm 314 of an adjacent member 306 between the projections 326 (e.g., the fork 328-2 receives the arm 314-1). The fork 328 of each member 306 may be disposed in the body 308 of that member 306. The engagement of the arm 314 of an adjacent member 306 with the fork 328 may restrict relative movement of the members (e.g., rotation of the member 306-1 with respect to member 306-2).

The arm 314 of each member may further include a branch 330 (e.g., branches 330-1 and 330-2 as depicted in FIGS. 32 and 33) that extends between adjacent members 306. In some embodiments, the projections 326 of the fork 328 may extend at an oblique angle to the branch 330. The oblique arrangement of the projections 326 may bring the ends of the projections 326 in close proximity to the inner face 334 (e.g., inner faces 334-1 and 334-2 as depicted in FIGS. 32 and 33) of the cavity 320 such that bending of the chain 300 causes the projections 326 to contact the inner face 334 to restrict bending.

Each arm 314 may further include a projection 332 (e.g., projections 332-1 on arm 314-1 and 332-2 on arm 314-2 as depicted in FIG. 33) extending transverse to the branch 330. The projection 332 may be configured to be at least partially disposed in the fork 328 of an adjacent member 306 (e.g., projection 332-1 of the member 306-1 is disposed in the fork 328-2 of member 306-2 as shown in FIGS. 32-33). The projection 332 may be configured to extend toward an inner face 334 (e.g., inner faces 334-1 and 334-2 as depicted in FIG. 33) of the cavity 320 of an adjacent member 306 such that a portion of the projection 332 may be in close proximity to the inner face 334. Contact of the projection 332 with the inner face 334 and the branch 330 with the perimeter of the aperture 324 may restrict relative movement of the members 306. For example, the minimum bend radius of the chain 300 in the direction of arrow 700 (shown in FIG. 3) may be greater than or equal to about 3 inches. The chain 300 may also have a minimum bend radius of greater than about 3 inches when the chain 300 is bent out of the plane of the sprocket 102.

Figure 34:
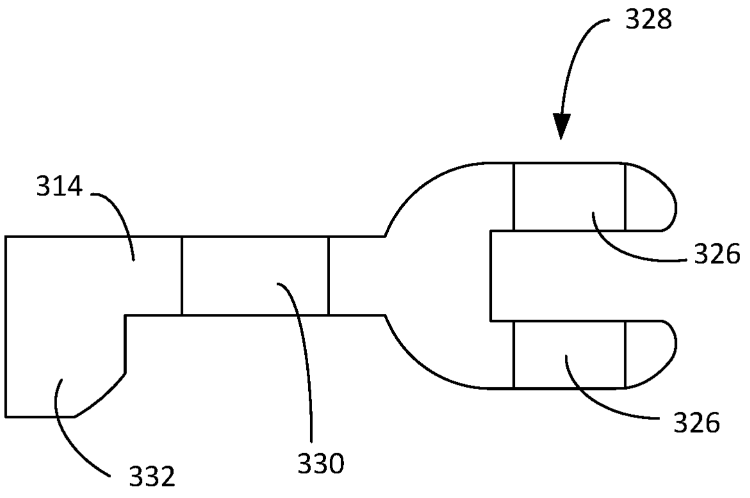
FIG. 34 is a front view of a portion of one of the members of the semi-rigid chain of FIG. 22 in a flat (e.g., untwisted) configuration.

The arms 314 of the members 306 can be manufactured in a variety of ways. For example, in one embodiment, the arms 314 are stamped in a flat configuration (as shown in FIG. 34). After stamping of the arm 314, the branch 330 may be twisted ninety degrees about its longitudinal axis and the fork 328 may be bent downward so that the arm 314 is in the form shown in FIGS. 32 and 33. The chain 300 can be assembled in a variety of ways. For example, the body 308 may be formed around the arms 314.

Figure 35:
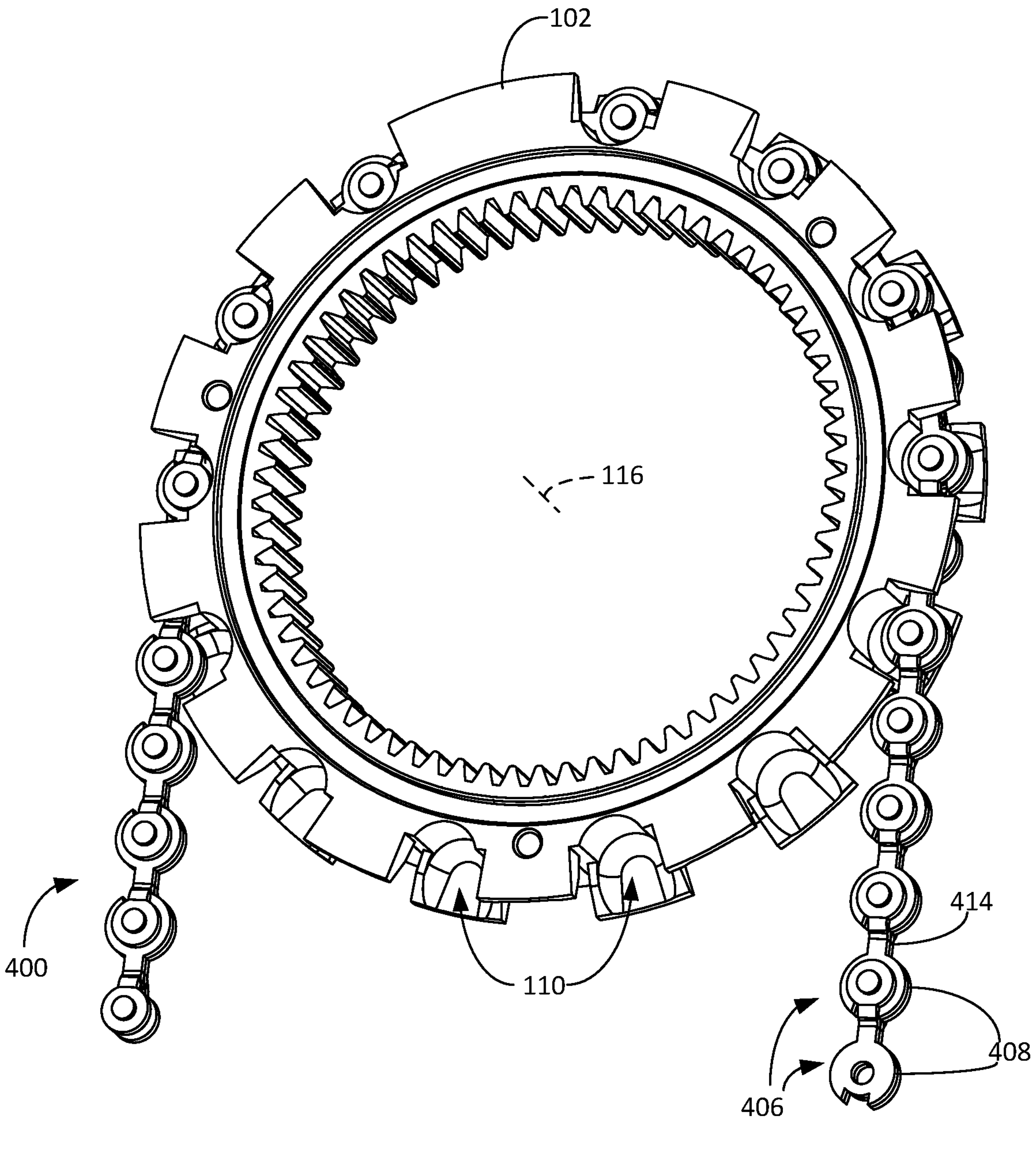
FIG. 35 is a perspective view of a semi-rigid chain according to another embodiment engaged with a sprocket of a manual roller shade.

FIG. 35 shows another embodiment of a semi-rigid chain 400 engaged with the sprocket 102. The chain 400 includes a plurality of members 406 engaged together in a loop. Each member 406 may include a body 408. As with the embodiment of FIGS. 2-11, the body 408 of each member 406 may be configured to be received in one of the recesses 110 of the sprocket 102 such that the chain 400 can be used to rotate the sprocket 102 and, thereby, raise and lower a window covering (e.g., the window covering 14). The body 408 of each member 406 may be substantially cylindrical to allow the body 408 to be received in one of the recesses 110.

Figure 36:
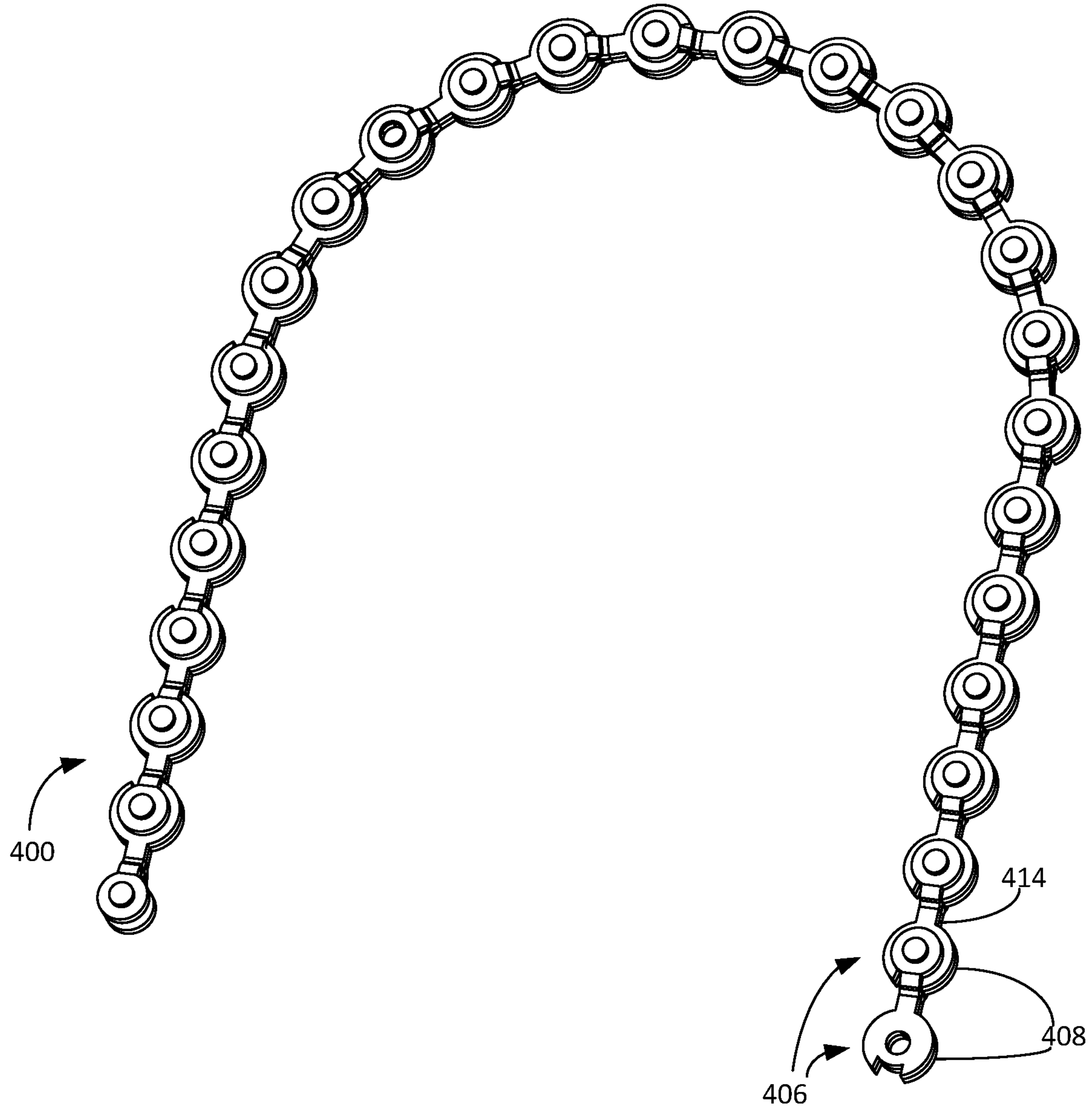
FIG. 36 is a partial perspective view of the semi-rigid chain of FIG. 35.
Figure 37:
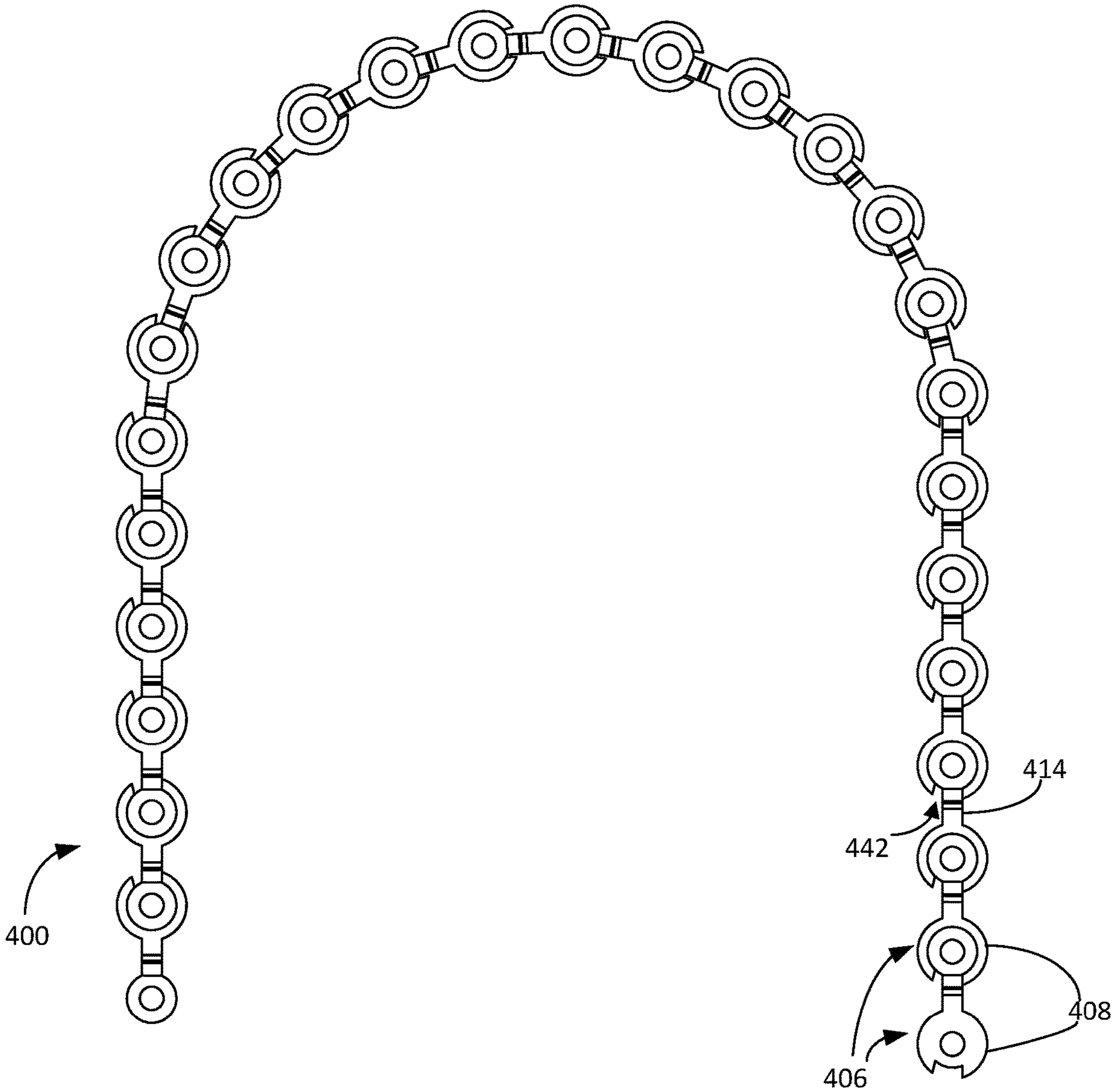
FIG. 37 is a partial front view of the semi-rigid chain of FIG. 35.
Figure 39:
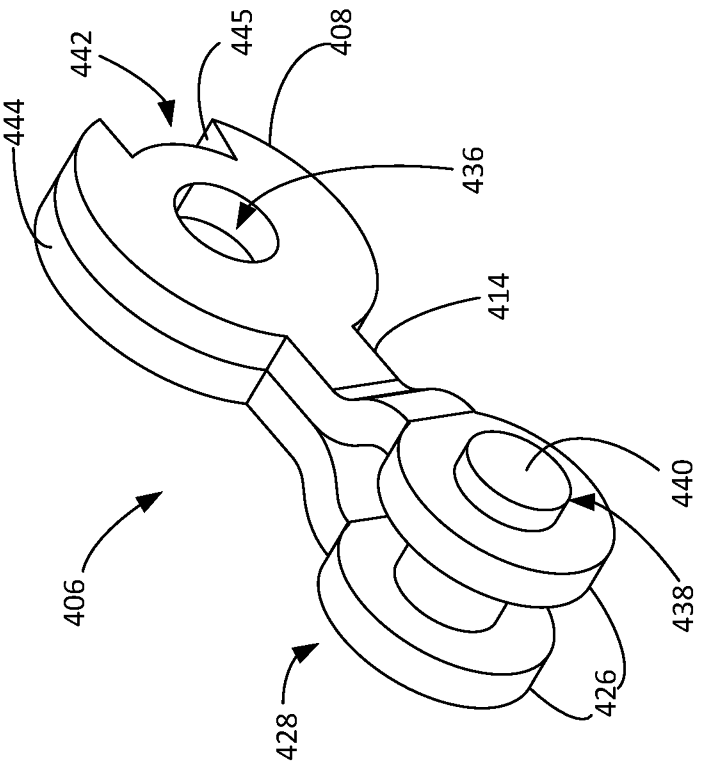
FIGS. 38 and 39 are perspective views of a member of the semi-rigid chain of FIG. 35.
Figure 38:
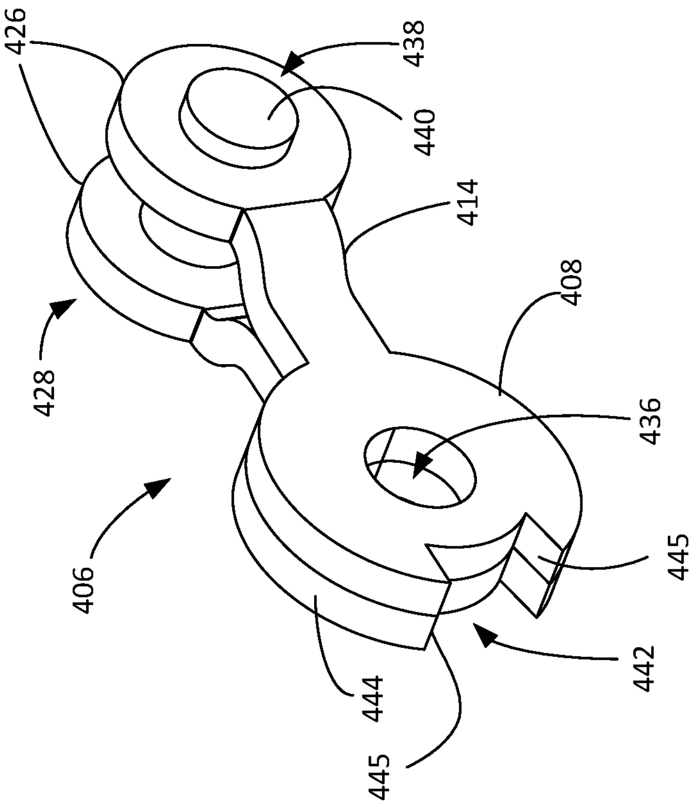
Figure 44:
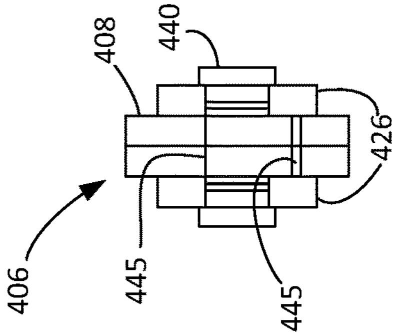
FIGS. 40-44 are front, top, bottom, left, and right views of a member of the semi-rigid chain of FIG. 35.
Figure 41:
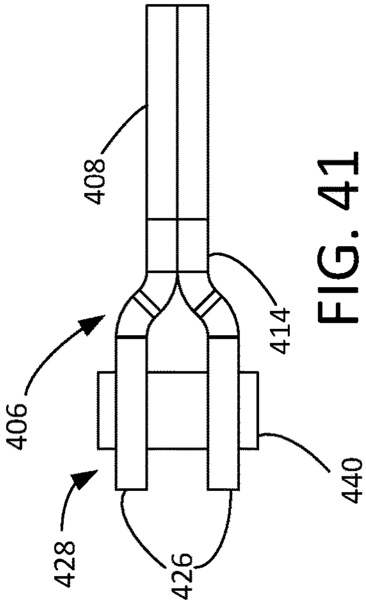

FIGS. 36 and 37 show partial perspective and front views of the chain 400, respectively. FIGS. 38 and 39 show perspective views of a single member 406 of the chain 400. FIGS. 40-44 show front, top, bottom, and side views of a single member 406 of the chain 400. In addition to the body 408, each member 406 may include an arm 414 extending from the body 408. The arm 414 may include two projections 426 forming a fork 428. When assembled, the fork 428 may receive a body 408 of an adjacent member 406 between the two projections 426. The body 408 may define a body aperture 436 and the projections 426 of the arm 414 may include arm apertures 438. Each member 406 may further include a pin 440 positioned in the body aperture 436 of one member 406 and the arm apertures 438 of an adjacent member 406 to join the two members 406 together.

Figure 40:
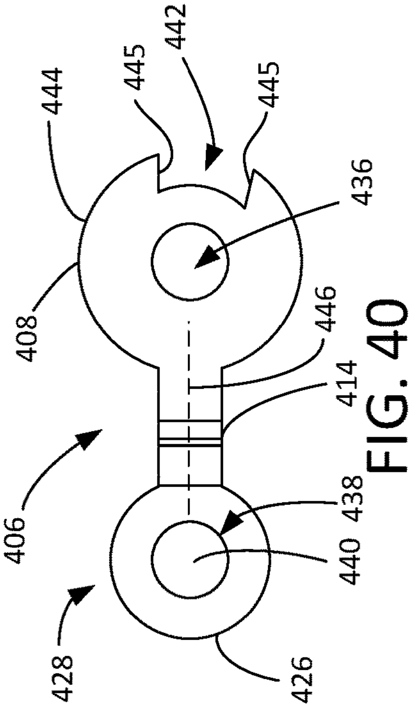
Figure 42:
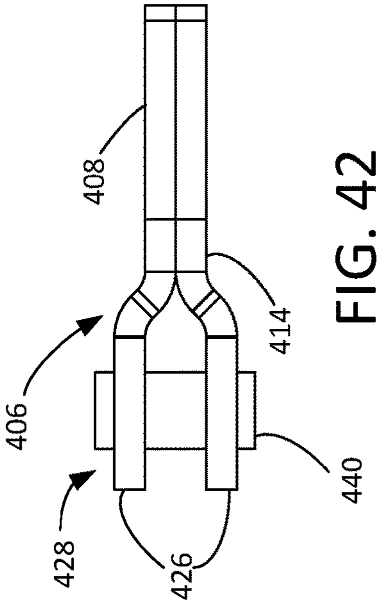

The body 408 of each member 406 may define a recess 442 extending into the body 408 from an outer face 444 of the body 408. As shown best in FIG. 37, when the chain 400 is assembled, the arm 414 of each member 406 is disposed in the recess 442 of an adjacent member 406. Contact of the arm 414 with walls 445 of the recess 442 may restrict rotation of the second member 406 with respect to the first member 406. The arm 414 of the member 406 may extend along a central longitudinal axis 446, shown in FIG. 40. In various embodiments, the recess 442 may be non-symmetric with respect to the central longitudinal axis 446. In other words, the recess 442 may extend further below the central longitudinal axis 446 than above the central longitudinal axis 446 (e.g., as shown in FIG. 40). As a result, the second member 406 is able to rotate further in a first direction (e.g., toward the center of the loop of the chain 400 and/or toward the sprocket 102; in the direction of arrow 700 in FIG. 3) than in an opposite, second direction (e.g., away from the center of the loop of the chain 400; in the direction of arrow 702 in FIG. 3). In various embodiments, the second member 406 may not able to rotate past parallel in the second direction.

Figure 43:
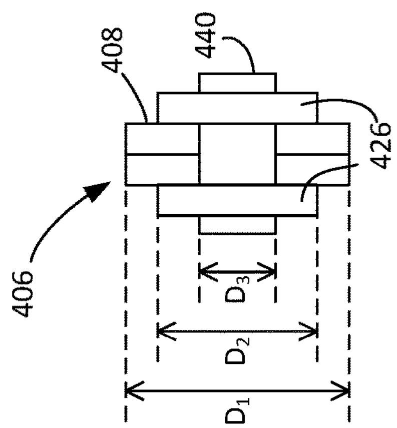

As shown in FIG. 43, the body 408 may be characterized by a first diameter $D_1$, the projections 426 of the arm 414 may be characterized by a second diameter $D_2$, and the pin 440 may be characterized by a third diameter $D_3$. The second diameter $D_2$ may be smaller than the first diameter $D_1$ (e.g., $D_2=0.70 \cdot D_1$), and the third diameter $D_3$ may be smaller than the second diameter $D_1$ (e.g., $D_3=0.50 \cdot D_2$). The tiered sizing of the body 408, the projections 426, and the pin 440 may cause the assembled parts to approximate the shape of a sphere or bead, which may allow the members 406 to fit better into the respective recesses 110 of the sprocket 102.

The members 406 of the chain 400 can be, for example, manufactured by coupling two sheets of material. Each projection 426 can be formed from one of the two sheets of material, with the other projection 426 formed from the other of the sheets of material.

Figure 45:
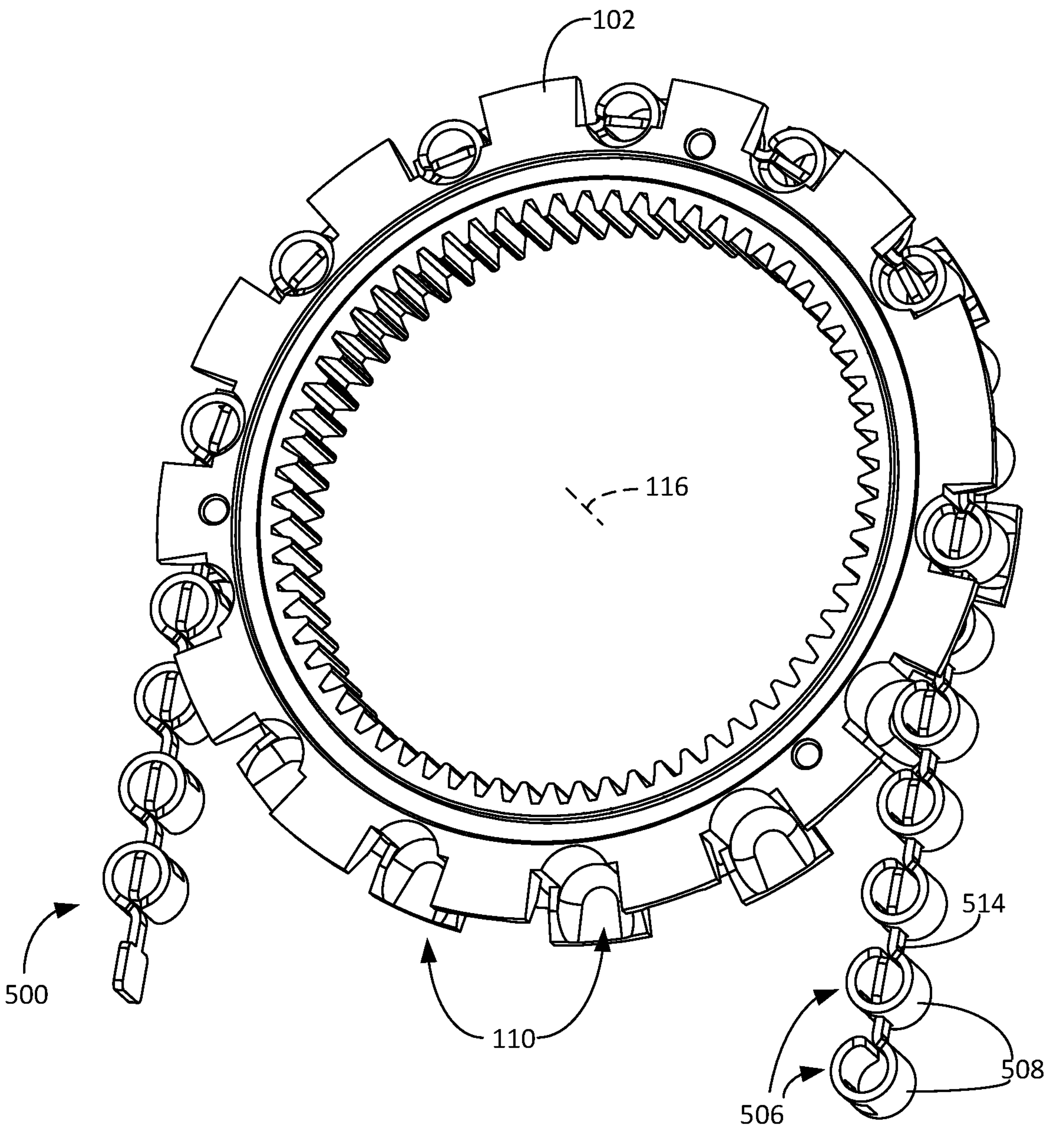
FIG. 45 is a perspective view of a semi-rigid chain according to another embodiment engaged with a sprocket of a manual roller shade.

FIG. 45 shows another embodiment of a semi-rigid chain 500 engaged with the sprocket 102. The chain 500 may include a plurality of members 506 joined together in a loop. Each member 506 may include a body 508 that is substantially cylindrical. As with the embodiment of FIGS. 2-11, the body 508 of each member 506 may be configured to be received in one of the recesses 110 of the sprocket 102 such that the chain 500 can be used to rotate the sprocket 102 and, thereby, raise and lower a window covering (e.g., the window covering 14). In various embodiments, the body 508 may be formed by rolling a sheet of material into a cylinder with a cavity 528 (shown in FIG. 49) within the cylinder.

Figure 46:
FIG. 46 is a partial perspective view of the semi-rigid chain of FIG. 45.
Figure 47:
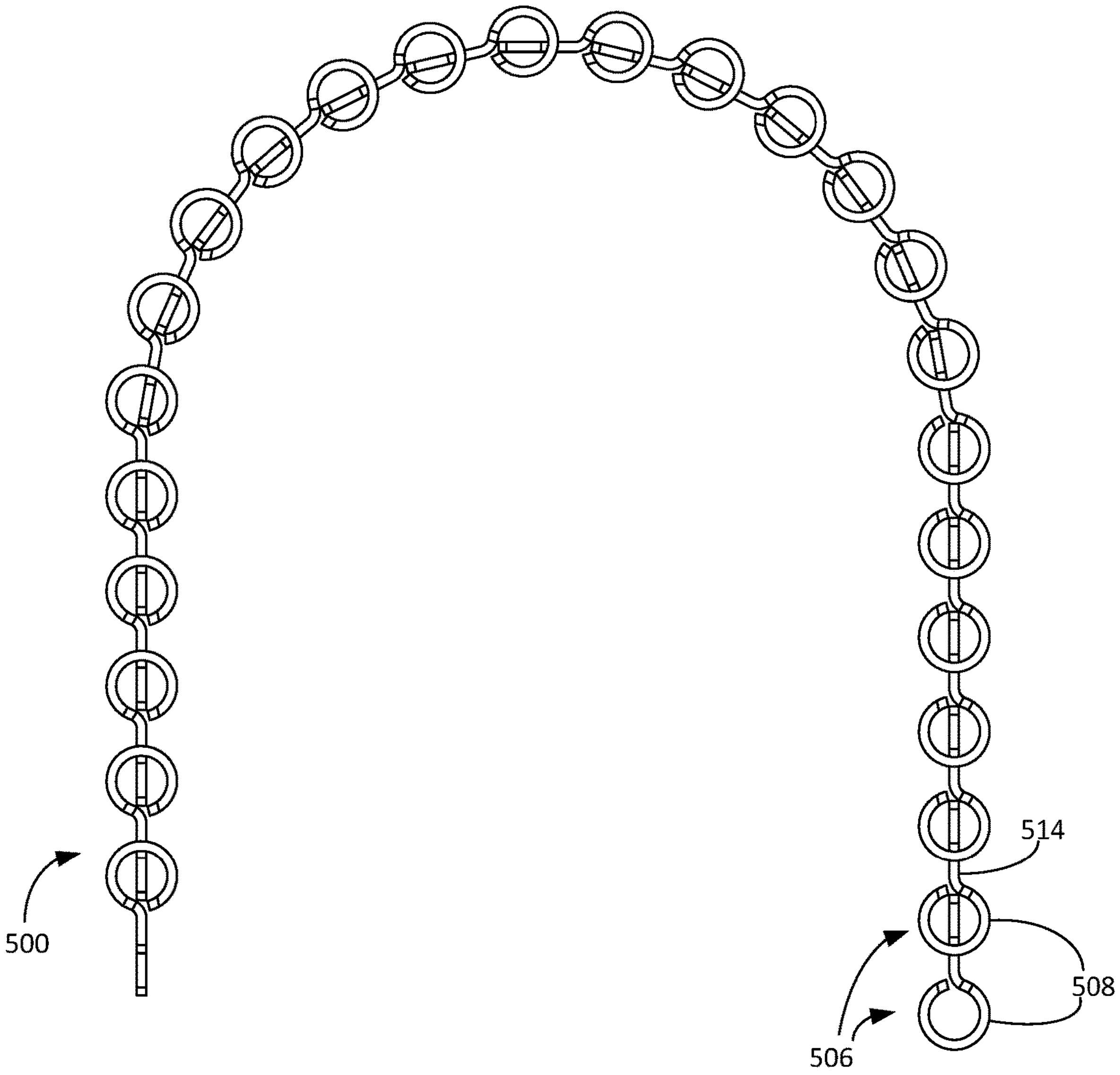
FIG. 47 is a partial front view of the semi-rigid chain of FIG. 45.
Figure 49:
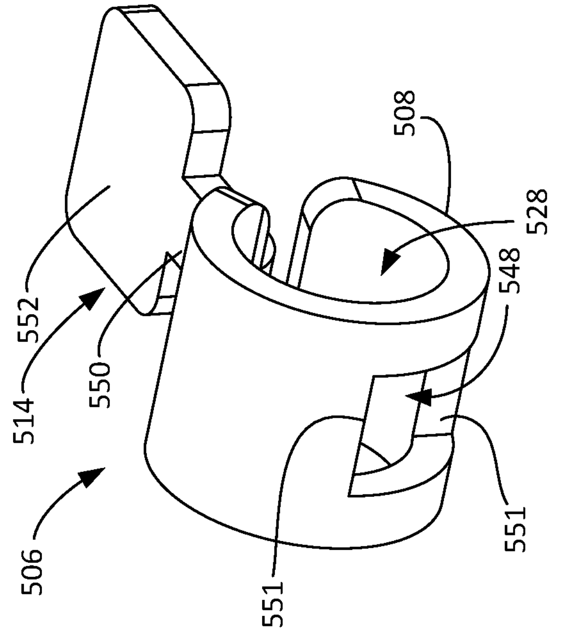
FIGS. 48 and 49 are perspective views of a member of the semi-rigid chain of FIG. 45.
Figure 48:
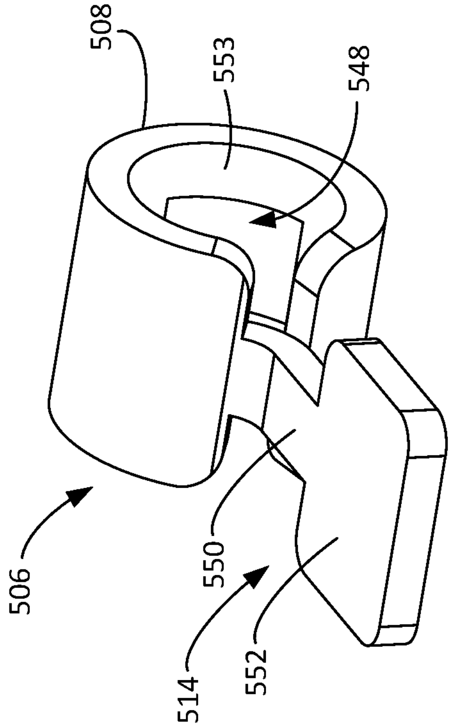
Figures 50, 51, 52, 53, 54:
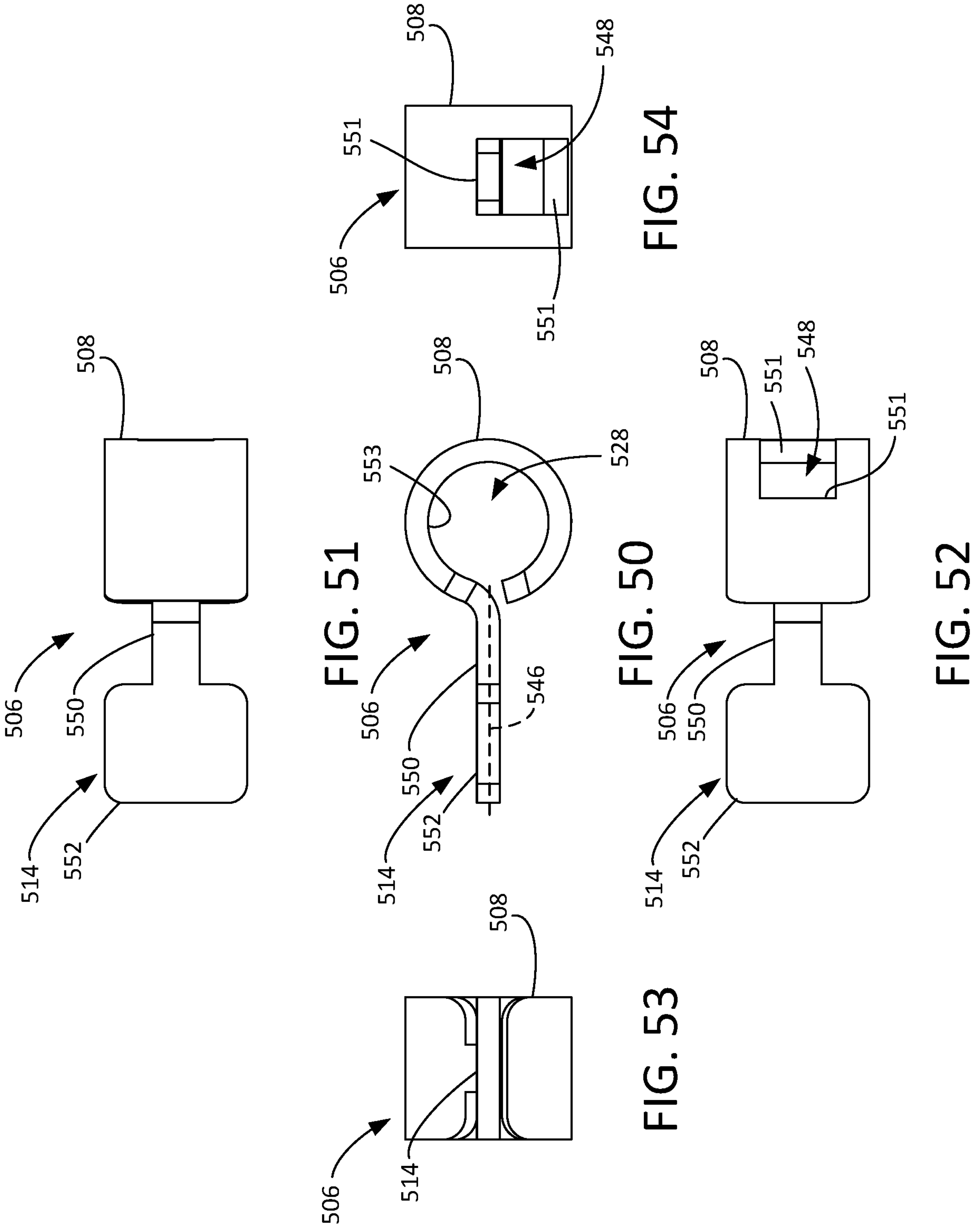
FIGS. 50-54 are front, top, bottom, left, and right views of a member of the semi-rigid chain of FIG. 45.

FIGS. 46 and 47 are partial perspective and front views of the chain 500. FIGS. 48 and 49 are perspective views of a single member 506 of the chain 500. FIGS. 50-54 are front, top, bottom, and side views of a single member 506 of the chain 500. In addition to the body 508, each member may include an arm 514 extending from the body 508. The body 508 may define a slot 548 through the body 508 configured to receive the arm 514 of an adjacent member 506. The arm 514 may include an extension 550 and a plate 552. When assembled, the extension 550 of the arm 514 of each member 506 may be disposed in the slot 548 of an adjacent member 506 and the plate 552 may be positioned within the cavity 528 formed by the body 508. Contact of the extension with walls 551 of the slot 548 and contact of the plate 552 with an inner wall 553 of the body 508 defining the cavity 528 may limit movement (e.g., rotation) of the adjacent members. The extension 550 of the arm 514 may define a central longitudinal axis 546. The slot 548 may be asymmetric with respect to the central longitudinal axis 546.

Figure 55:
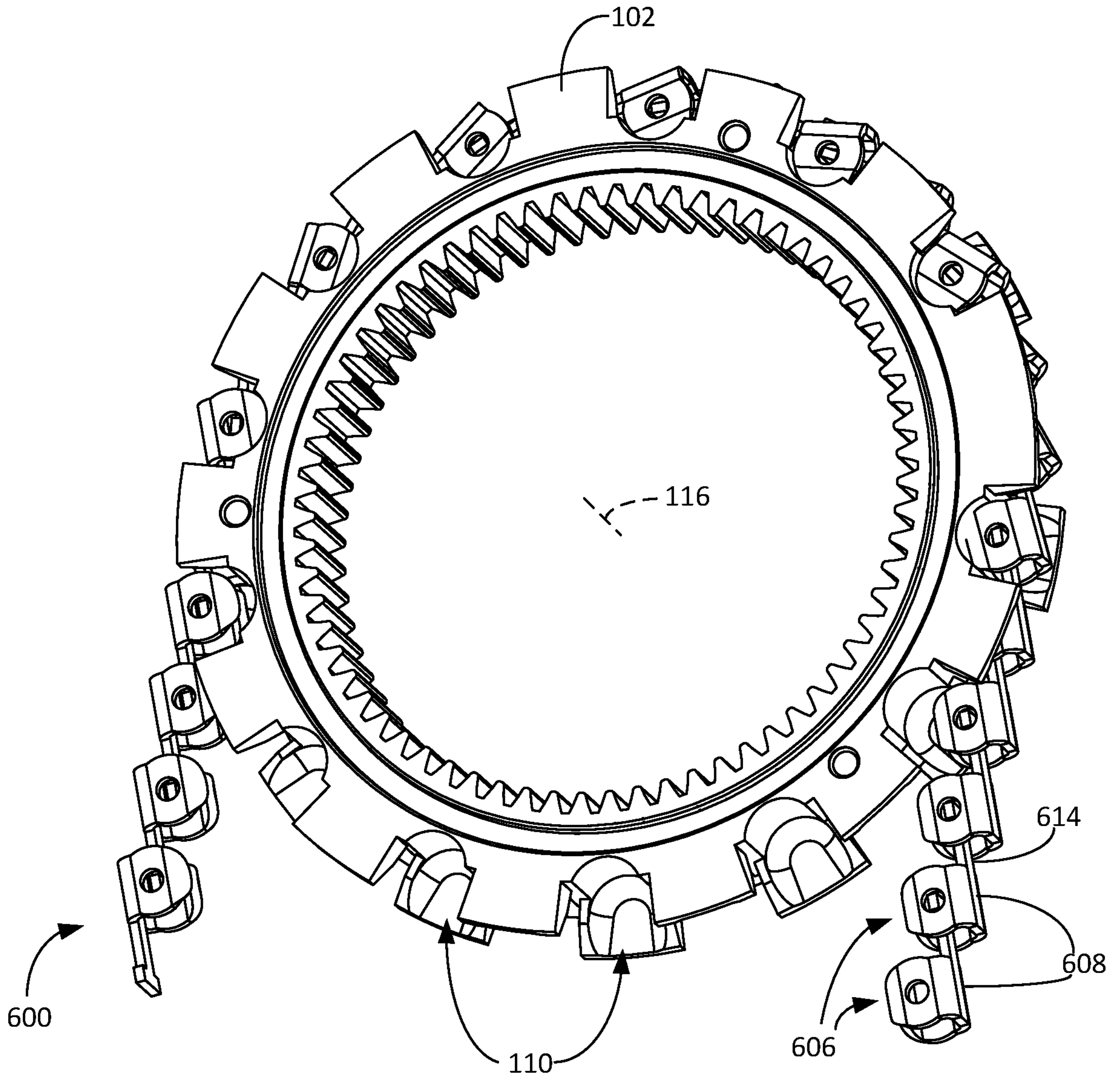
FIG. 55 is a perspective view of a semi-rigid chain according to another embodiment engaged with a sprocket of a manual roller shade.

FIG. 55 shows another embodiment of a semi-rigid chain 600 engaged with the sprocket 102. The chain 600 may include a plurality of members 606 joined together in a loop. Each member 606 may include a body 608. As with the embodiment of FIGS. 2-11, the body 608 of each member 606 may be configured to be received in one of the recesses 110 of the sprocket 102 so that the chain 600 can be used to rotate the sprocket 102 and, thereby, raise and lower a window covering (e.g., the window covering 14).

Figure 56:
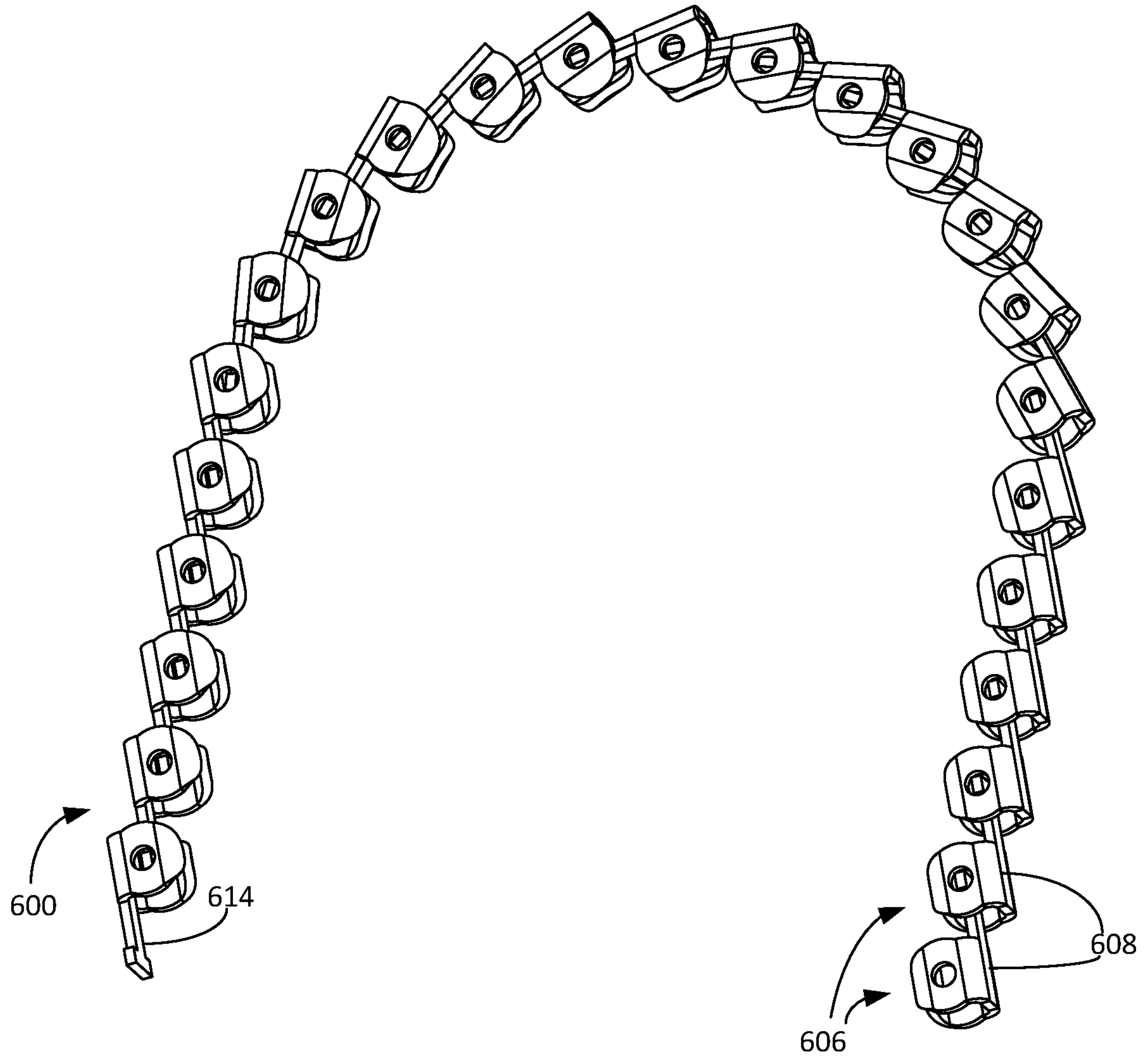
FIG. 56 is a partial perspective view of the semi-rigid chain of FIG. 55.
Figure 57:
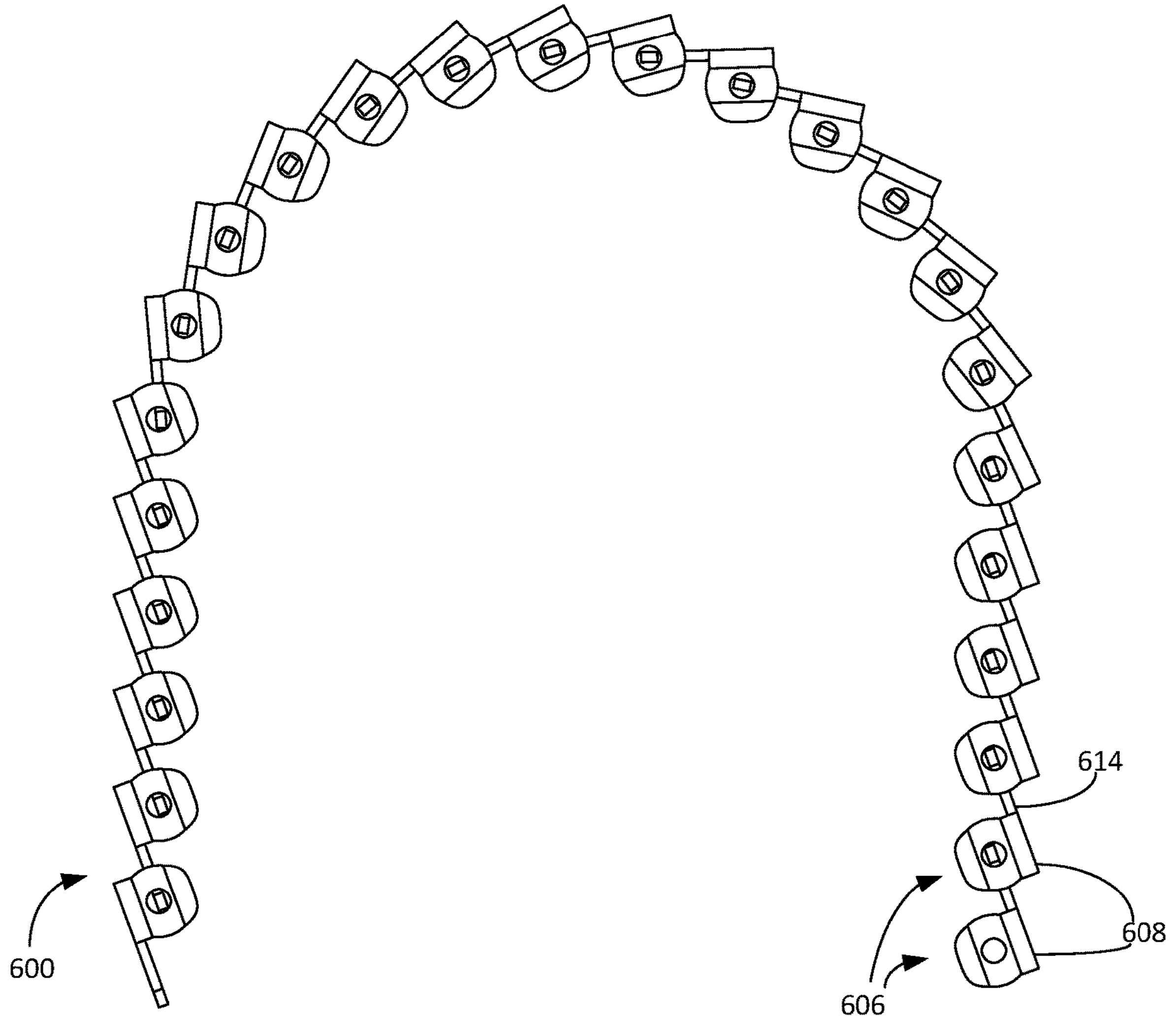
FIG. 57 is a partial front view of the semi-rigid chain of FIG. 55.
Figure 59:
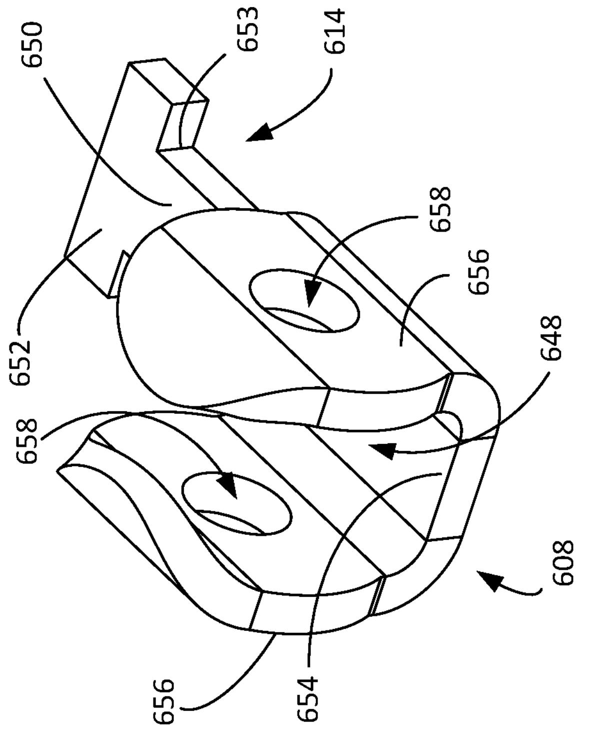
FIGS. 58 and 59 are perspective views of a member of the semi-rigid chain of FIG. 55.
Figure 58:
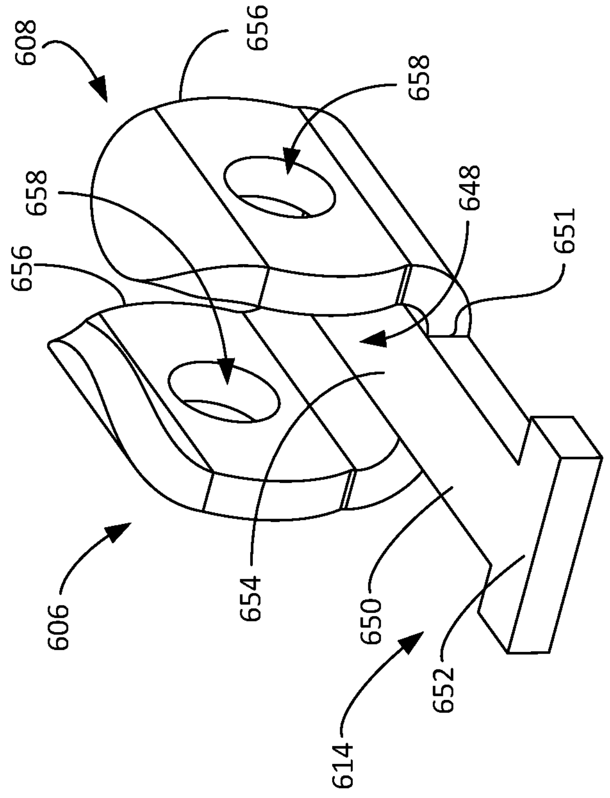
Figures 60, 61, 62, 63, 64:
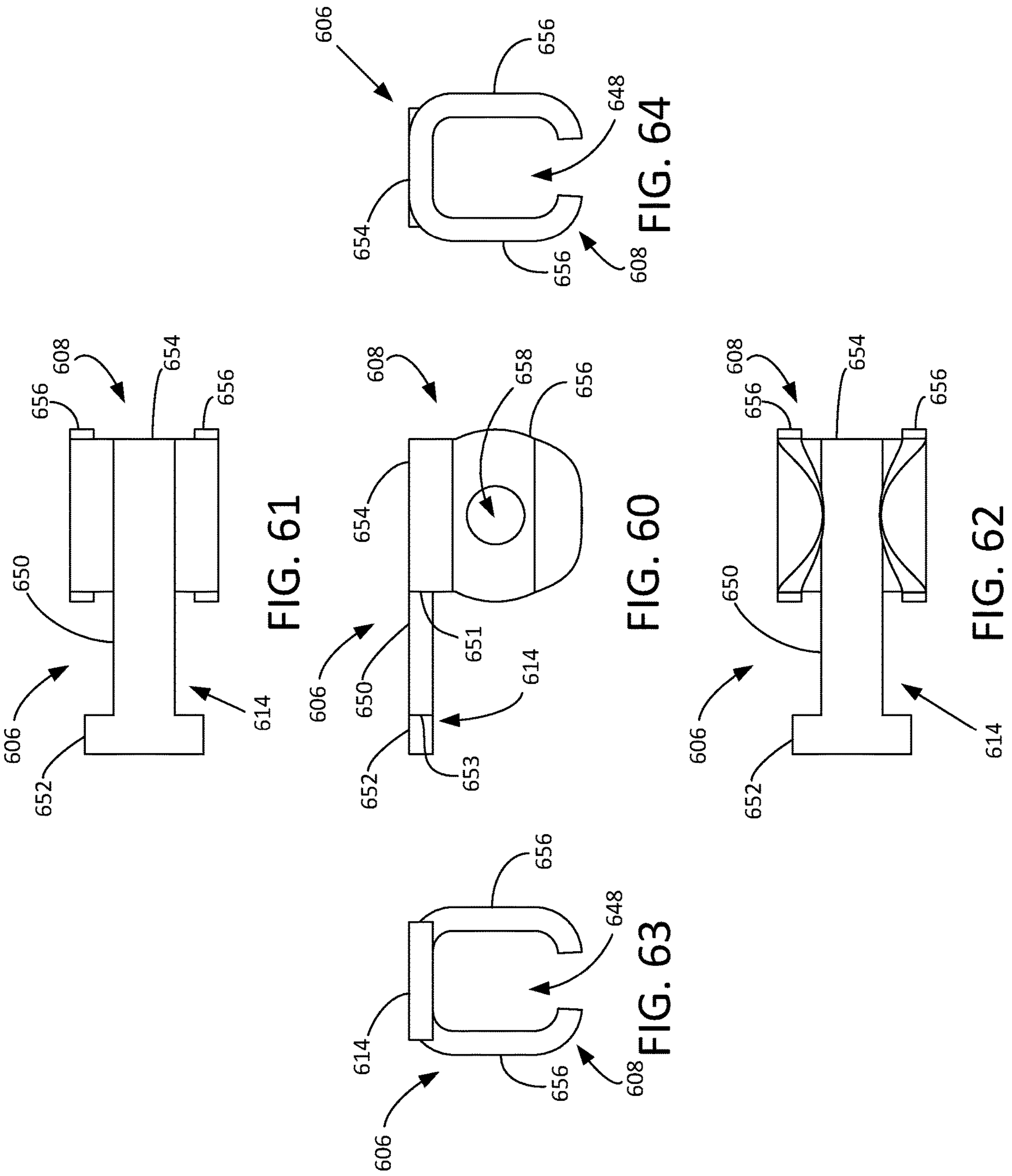
FIGS. 60-64 are front, top, bottom, left, and right views of a member of the semi-rigid chain of FIG. 55.

FIGS. 56 and 57 are partial perspective and front views, respectively, of the chain 600. FIGS. 58 and 59 are perspective views of a single member 606 of the chain 600. FIGS. 60-64 are front, top, bottom, and side views of a single member 606 of the chain 600. In various embodiments, the body 608 includes a base 654 and first and second wings 656 with each of the first and second wings 656 extending upwardly from the base 654 such that a cavity 648 is defined between the base 654 and the first and second wings 656. Each of the first and second wings 656 may define an aperture 658. In addition to the body 608, each member 606 may include an arm 614 extending from the body 608. The arm 614 may include an extension 650 extending from a first end 651 coupled to the body 608 to a second end 653. The arm 614 may further include a plate 652 coupled to the second end 653 of the extension 650 and extending transverse to the extension 650.

The cavity 648 may be sized to receive the plate 652 of an adjacent member 606 with the plate 652 of the adjacent member 606 disposed within the apertures 658 of the wings 656 to retain the adjacent member 606. Contact of the extension 650 of one member with the base 654 of the adjacent member 606 may restrict movement of the members 606 relative to one another. Specifically, contact of the extension 650 with the base 654 may prevent rotation of the member in the frontal plane away from the sprocket 102.

With each of the embodiments of chains described herein, the chain may have a first minimum bend radius when the chain is bent in a first direction and a second minimum bend radius when bent in a second direction and the first minimum bend radius may be less than the second minimum bend radius. Specifically, the chains may be able to bend in a tighter radius inward, around the sprocket (the direction illustrated by arrow 700 in FIG. 3), than they are able to bend outward, away from the sprocket (the direction illustrated by arrow 702 in FIG. 3). This may restrict bending of the chain away from the sprocket or away from the frontal plane of the sprocket, while still allowing the chains to conform to the radius of the sprocket. In some embodiments, bending of the chain outward, away from the sprocket (in the direction illustrated by arrow 702) or away from the frontal plane of the sprocket, is restricted such that the minimum bend radius in these directions is greater than or equal to about three inches. The term "minimum bend radius" as used herein means the smallest radius that the chain can be bent into in a given direction without causing damage or permanent deformation of members of the chain.

It should be understood that, in any of the embodiments described herein, not all of the members of a chain need to be configured to restrict movement of the chain. For example, a chain can be constructed with some members of the chain being configured to restrict bending of the chain while other members are not configured to restrict bending of the chain.

Figure 65:
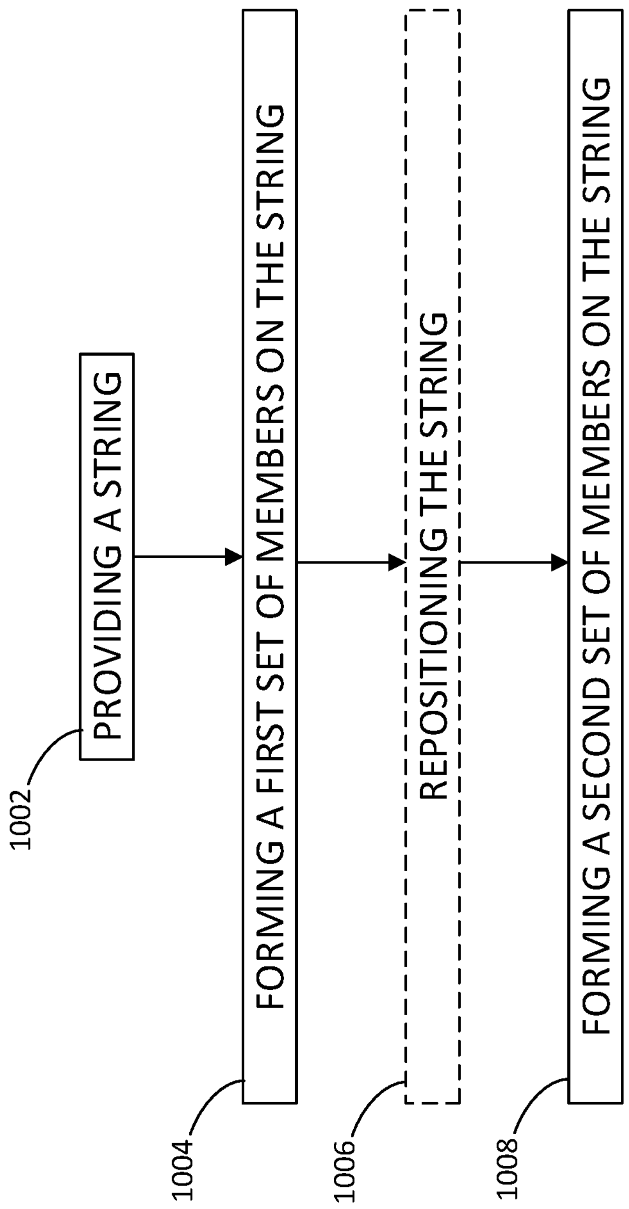
FIG. 65 is a flowchart illustrating a method of manufacturing a chain for a window treatment, according to an embodiment.

FIG. 65 illustrates a method of forming a chain, such as the chain 200 shown in FIG. 12. The method includes, at step 1002, providing a string. The method further includes, at step 1004, forming a first set of members on the string. The first set of members are spaced along the string. Optionally, at step 1006, the string may be repositioned. The repositioning can, for example, align different portions of the string with portions of the machinery used to form the members. The method further includes, at step 1008, forming a second set of members on the string after forming the first set of members. Each member of the second set of members is disposed between adjacent members of the first set of members. In some embodiments, forming the second set of members includes forming an arm of each of the members of the second set of members such that the arm of each of the second set of members is disposed at least partially in a recess of an adjacent member of the first set of members.

While the foregoing description and drawings represent preferred or exemplary embodiments of the present disclosure, it will be understood that various additions, modifications and substitutions may be made therein without departing from the spirit and scope and range of equivalents of the accompanying claims. In particular, it will be clear to those skilled in the art that the embodiments disclosed herein may be embodied in other forms, structures, arrangements, proportions, sizes, and with other elements, materials, and components, without departing from the spirit or essential characteristics thereof. One skilled in the art will further appreciate that the window treatment systems described herein may be used with many modifications of structure, arrangement, proportions, sizes, materials, and components and otherwise, used in the practice of the window treatment systems, which are particularly adapted to specific environments and operative requirements without departing from the principles of the present disclosed herein. The presently disclosed embodiments are therefore to be considered in all respects as illustrative and not restrictive, the scope being defined by the appended claims and equivalents thereof, and not limited to the foregoing description or embodiments. Rather, the appended claims should be construed broadly, to include other variants and embodiments, which may be made by those skilled in the art without departing from the scope and range of equivalents. All patents and published patent applications identified herein are incorporated herein by reference in their entireties.

What is claimed is:

1. A chain for a window covering comprising a plurality of serially coupled members that form a continuous loop;

wherein each of the plurality of serially coupled members includes a body and a structural element affixed to the body, the structural element to contact an adjacent member of the plurality of members;

wherein the chain has a first minimum bend radius in a first direction, the first bend radius toward the center of the continuous loop;

wherein the chain has a second minimum bend radius in a second direction opposite the first direction, the second direction away from the center of the continuous loop; and wherein the second minimum bend radius is greater than the first minimum bend radius.

2. The chain of claim 1 wherein the second bend radius is greater than or equal to about three inches.

3. The chain of claim 1:

wherein the chain further comprises a flexible elongated member;

wherein the body of each of the plurality of members is fixedly coupled to the elongated member such that each member of the plurality of members is located at a respective position along a length of the elongated member;

wherein the structural element includes an arm extending from the body of each of the plurality of members; and wherein the arm extending from the body of each of the plurality of members contacts at least a portion of an adjacent member of the plurality of members when the elongated member is bent in the second direction to restrict bending of the elongated member in the second direction.

4. The chain of claim 3, wherein the arm extending from the body of each of the plurality of members extends substantially parallel to a section of the elongated member that passes through the body.

5. The chain of claim 3, wherein the body of each of the plurality of members is substantially spherical and is sized and configured to be received by the drive sprocket of the shade.

6. The chain of claim 3, wherein the body of each of the plurality of serially coupled members includes a cavity, and wherein the arm of each of the plurality of members is at least partially disposed in the cavity of an adjacent one of the plurality of members member when the plurality of members are linearly aligned.

7. The chain of claim 3, wherein the arm extends from the body of each member of the plurality of members in only a single direction.

8. The chain of claim 3, wherein the arm extends from the body of each member of the plurality of members in two directions.

9. The chain of claim 1:

wherein the structural element includes an arm extending from the body;

wherein the arm extending from the body of each of the plurality of members is couplable to the body of an adjacent member of the plurality of members; and wherein the arm of each member of the plurality of members includes a first end having two projections forming a fork and a second end, the fork configured to receive, between the two projections, the second end of the arm extending from the body of an adjacent one of the plurality of members.

10. The chain of claim 9, wherein the fork of the arm extending from the body of each of the plurality of members is disposed within the body of that member.

11. The chain of claim 9, wherein the arm extending from the body of each of the plurality of members has a branch extending between that member and an adjacent member and the fork extends at an oblique angle to the branch.

12. The chain of claim 9, wherein the arm extending from the body of each of the plurality of members includes two projections forming a fork, and wherein the body of an adjacent member is disposed at least partially between the two projections of the fork.

13. A chain for a shade, the chain comprising:

a flexible elongated member forming a loop; and a plurality of members fixedly coupled to the flexible elongated member such that each of the plurality of members is located at a respective position along a length of the flexible elongated member;

wherein each of the plurality of members includes:

a body affixed at a defined location on the flexible elongated member; and an arm extending from the body;

wherein, when disposed about a drive sprocket of the shade, a frontal plane transects each of the plurality of members engaged with the drive sprocket and a transverse plane is orthogonal to the frontal plane; and wherein the arm of each of the plurality of members is configured to contact at least a portion of an adjacent member of the plurality of members to permit bending of the chain in a first direction in the frontal plane having a first minimum bend radius toward the center of the loop, while restricting bending of the chain in the transverse plane and in a second direction having a second minimum bend radius away from the center of the loop and opposite the first direction in the frontal plane.

14. The chain of claim 13, wherein the arm of each member of the plurality of members extends substantially parallel to a section of the flexible elongated member that passes through an aperture formed in the body of the respective member.

15. The chain of claim 13, wherein the chain is restricted from bending in the second direction such that the second minimum bend radius in the second direction is greater than or equal to about three inches.

16. The chain of claim 13, wherein the body of each of the plurality of members is substantially spherical and is sized and configured to be received by the drive sprocket of the shade.

17. The chain of claim 16, wherein the body of each of the plurality of members includes a cavity, and wherein the arm extending from the body of each member of the plurality of members is at least partially disposed in the cavity of an adjacent member of the plurality of members.

18. The chain of claim 13, wherein the arm extending from the body of each member of the plurality of members extends from the body in only a single direction.

19. The chain of claim 13, wherein the arm extending from the body of each member of the plurality of members extends from that member's body in two directions.

20. A manually-operated window treatment system, comprising:

a roller tube that is supported at opposed ends thereof;

a sprocket coupled to the roller tube;

a covering material that is attached to the roller tube, the covering material operable between a raised position and a lowered position via rotation of the roller tube; and a chain configured to be operated by a user to rotate the roller tube, the chain including a plurality of members joined in a continuous loop, wherein the chain has a first minimum bend radius when bent in a first direction toward a center of the continuous loop and a second minimum bend radius when bent in a second direction away from the center of the continuous loop, and wherein the first minimum bend radius is less than the second minimum bend radius.

* * * * *